US012338919B2

(12) United States Patent
Jacobs et al.

(10) Patent No.: US 12,338,919 B2
(45) Date of Patent: Jun. 24, 2025

(54) OIL AND GAS PIPE CONNECTOR

(71) Applicant: Cobalt Coupler Systems, LLC, Fort Collins, CO (US)

(72) Inventors: Jon Joseph Jacobs, Fort Collins, CO (US); Lonnie Joseph Jacobs, Fort Collins, CO (US); Robert Wayne Noyer, Carr, CO (US); Lloyd Dale Seaton, Windsor, CO (US)

(73) Assignee: Cobalt Coupler Systems, LLC, Fort Collins, CO (US)

( * ) Notice: Subject to any disclaimer, the term of this patent is extended or adjusted under 35 U.S.C. 154(b) by 0 days.

(21) Appl. No.: 18/097,344

(22) Filed: Jan. 16, 2023

(65) Prior Publication Data

US 2023/0151913 A1 May 18, 2023

Related U.S. Application Data

(63) Continuation of application No. 16/109,641, filed on Aug. 22, 2018, now Pat. No. 11,560,972, which is a continuation-in-part of application No. 15/678,015, filed on Aug. 15, 2017, now Pat. No. 10,962,157, which is a continuation-in-part of application No. 15/490,691, filed on Apr. 18, 2017, now Pat. No. 11,060,646.

(51) Int. Cl.
*F16L 21/04* (2006.01)
*B23P 15/00* (2006.01)
*F16L 21/03* (2006.01)
*F16L 21/08* (2006.01)

(52) U.S. Cl.
CPC ............. *F16L 21/045* (2013.01); *B23P 15/00* (2013.01); *F16L 21/03* (2013.01); *F16L 21/08* (2013.01); *Y10T 29/49826* (2015.01); *Y10T 29/4987* (2015.01)

(58) Field of Classification Search
CPC ....... B23P 15/00; B21D 39/04; B21D 39/046; F16L 13/14; F16L 21/08; F16L 21/03; F16L 21/045; F16L 37/091; F16L 21/02; Y10T 29/49826; Y10T 29/4987
See application file for complete search history.

(56) References Cited

U.S. PATENT DOCUMENTS

| 320,683 A | 6/1885 | Phillis |
| 796,580 A | 8/1905 | Johnston |
| 1,949,451 A | 3/1934 | Brulatour |

(Continued)

FOREIGN PATENT DOCUMENTS

| CA | 2532119 | 1/2005 |
| DE | 2609576 A1 | 11/1976 |

(Continued)

OTHER PUBLICATIONS

Daemar Inc. Self-Locking Retaining Rings. http://daemar.com, downloaded May 15, 2017, total 2 pages.

(Continued)

*Primary Examiner* — Sarang Afzali
*Assistant Examiner* — Darrell C Ford
(74) *Attorney, Agent, or Firm* — Craig R. Miles; CR MILES P.C.

(57) ABSTRACT

Pipe connectors and methods of making and using pipe connectors to connect oil or gas pipe in oil and gas production, refining and distribution.

27 Claims, 26 Drawing Sheets

(56) References Cited

U.S. PATENT DOCUMENTS

| | | | |
|---|---|---|---|
| 2,201,372 | A | 5/1940 | Miller |
| 2,980,449 | A | 4/1961 | Dunton |
| 3,245,701 | A | 4/1966 | Leopold, Jr. et al. |
| 3,425,717 | A | 2/1969 | Bruce |
| 3,592,481 | A | 7/1971 | Jeffery et al. |
| 4,054,306 | A | 10/1977 | Sadoff, Jr. et al. |
| 4,613,172 | A | 9/1986 | Schattmaier |
| 5,160,179 | A | 11/1992 | Takagi |
| 5,553,895 | A | 9/1996 | Karl et al. |
| 5,722,702 | A | 3/1998 | Washburn |
| 5,769,460 | A | 6/1998 | Imai |
| 6,499,771 | B1 | 12/2002 | Snyder, Sr. et al. |
| 6,502,865 | B1 | 1/2003 | Steele |
| 6,663,145 | B1* | 12/2003 | Lyall, III ............... F16L 37/091 285/104 |
| 6,719,330 | B2 | 4/2004 | Brown et al. |
| 6,805,383 | B2 | 10/2004 | Ostrander et al. |
| 6,851,446 | B2 | 2/2005 | van der Meijden et al. |
| 6,913,292 | B2 | 7/2005 | Snyder, Sr. et al. |
| 6,964,436 | B2 | 11/2005 | Le Quere |
| 7,121,593 | B2 | 10/2006 | Snyder, Sr. et al. |
| 7,344,166 | B2 | 3/2008 | Ketcham |
| 7,467,813 | B2 | 12/2008 | Gunderson |
| 7,500,699 | B2 | 3/2009 | Snyder, Sr. et al. |
| 7,748,754 | B2 | 7/2010 | Snijders et al. |
| 7,866,707 | B2 | 1/2011 | Sudar |
| 7,891,380 | B2 | 2/2011 | Gunderson |
| 7,914,051 | B2 | 3/2011 | Stoll et al. |
| 7,950,701 | B2 | 5/2011 | Dole et al. |
| 8,052,406 | B2 | 11/2011 | Li et al. |
| 8,091,932 | B2 | 1/2012 | Nijsen |
| 8,177,263 | B2 | 5/2012 | Dole et al. |
| 8,312,616 | B2 | 11/2012 | Dole et al. |
| 8,317,202 | B2 | 11/2012 | Rode et al. |
| 8,342,579 | B2 | 1/2013 | Hennemann et al. |
| 8,516,678 | B2 | 8/2013 | Hennemann et al. |
| 8,517,430 | B2 | 8/2013 | Dole et al. |
| 8,556,302 | B2 | 10/2013 | Dole |
| 8,607,431 | B2 | 12/2013 | Rode et al. |
| 8,662,557 | B2 | 3/2014 | Rode et al. |
| 8,801,048 | B2 | 8/2014 | Morris et al. |
| 8,814,219 | B2 | 8/2014 | Hennemann et al. |
| RE45,304 | E | 12/2014 | Dole et al. |
| 8,925,176 | B2 | 1/2015 | Choi et al. |
| 8,979,138 | B2 | 3/2015 | Dole et al. |
| 9,016,746 | B2 | 4/2015 | Rode et al. |
| D731,627 | S | 6/2015 | Guest |
| 9,121,535 | B2 | 9/2015 | Ammon et al. |
| 9,150,226 | B2 | 10/2015 | Rode et al. |
| D761,892 | S | 7/2016 | McCarty et al. |
| 9,388,922 | B2 | 7/2016 | Dole |
| 9,523,454 | B2 | 12/2016 | Schutte et al. |
| 9,568,127 | B2 | 2/2017 | Morris et al. |
| 10,962,157 | B2 | 3/2021 | Jacobs |
| 11,060,646 | B2 | 7/2021 | Jacobs et al. |
| 12,203,581 | B2* | 1/2025 | Wells ................... B29C 57/025 |
| 12,276,360 | B2* | 4/2025 | Gibb ................... F16L 21/065 |
| 2004/0239115 | A1 | 12/2004 | Wilk, Jr. et al. |
| 2005/0040650 | A1 | 2/2005 | Chang |
| 2005/0146133 | A1 | 7/2005 | Snyder, Sr. et al. |
| 2005/0173923 | A1 | 8/2005 | Ketcham et al. |
| 2006/0022454 | A1 | 2/2006 | Le Clinche et al. |
| 2006/0265852 | A1 | 11/2006 | Snyder, Sr. et al. |
| 2008/0111369 | A1 | 5/2008 | Pettinaroli |
| 2008/0185838 | A1 | 8/2008 | Sudar |
| 2008/0191481 | A1 | 8/2008 | Hartmann |
| 2008/0203723 | A1 | 8/2008 | Cellemme |
| 2009/0001712 | A1 | 1/2009 | Webb et al. |
| 2009/0032170 | A1 | 2/2009 | Williams |
| 2009/0194990 | A1 | 8/2009 | Williams |
| 2010/0194098 | A1 | 8/2010 | Hennemann et al. |
| 2010/0194104 | A1 | 8/2010 | Hennemann et al. |
| 2011/0214886 | A1 | 9/2011 | Orr |
| 2011/0254262 | A1* | 10/2011 | Manning ............... F16L 37/148 285/31 |
| 2012/0211209 | A1 | 8/2012 | Choi et al. |
| 2013/0149031 | A1* | 6/2013 | Changsrivong ....... F16B 21/186 403/376 |
| 2013/0154260 | A1 | 6/2013 | Jamison et al. |
| 2015/0276099 | A1 | 10/2015 | Weissmann |
| 2015/0276103 | A1* | 10/2015 | Manning ............... F16L 21/022 285/351 |
| 2015/0285420 | A1 | 10/2015 | Stout et al. |
| 2015/0354737 | A1* | 12/2015 | Stout ..................... F16L 21/022 285/369 |
| 2016/0076682 | A1* | 3/2016 | Conrad .................. B32B 15/08 285/21.1 |
| 2016/0305583 | A1* | 10/2016 | Conrad .................. F16L 23/024 |
| 2018/0363815 | A1* | 12/2018 | Jacobs .................. F16L 21/045 |

FOREIGN PATENT DOCUMENTS

| | | |
|---|---|---|
| DE | 10335511 A1 | 10/2004 |
| DE | 102007054025 | 5/2009 |
| DE | 202011101106 | 8/2012 |
| EP | 241656 | 10/1987 |
| EP | 2677225 A2 | 12/2013 |
| EP | 3139076 A1 | 3/2017 |
| FR | 2747453 A1 | 10/1997 |
| FR | 2777341 A1 | 10/1999 |
| FR | 3001023 A1 | 7/2014 |
| GB | 1 372 241 A | 10/1974 |
| JP | 54114821 A | 9/1979 |
| WO | 2008144332 A1 | 11/2008 |
| WO | 2014144026 A2 | 9/2014 |

OTHER PUBLICATIONS

Traceparts. 3D models ANSI_ASME Inch Countersunk External Tooth-Lock Washers—Type B, https://www.tracepartsonline.net, downloaded May 15, 2017, total 2 pages.
Arnco Corporation. Shur-Lock™ II Couplers. Product Bulletin, dated May 2006, 1 page.
U.S. Appl. No. 16/109,641, Office Action mailed Mar. 16, 2021.
U.S. Appl. No. 16/109,641, Office Action mailed Dec. 30, 2021.
U.S. Appl. No. 16/109,641, Office Action mailed Feb. 28, 2022.
PCT International Patent Application No. PCT/US18/26587, International Search Report and Written Opinion of the International Searching Authority dated Jul. 26, 2018, 27 pages.
U.S. Appl. No. 15/490,691, Office Action mailed Feb. 19, 2019.
U.S. Appl. No. 15/490,691, Office Action mailed Aug. 6, 2019.
U.S. Appl. No. 15/490,691, Office Action mailed Jan. 7, 2020.
U.S. Appl. No. 15/678,015, Office Action mailed Feb. 4, 2019.
U.S. Appl. No. 15/678,015, Office Action mailed Aug. 13, 2019.
U.S. Appl. No. 15/678,015, Office Action mailed Mar. 3, 2020.
U.S. Appl. No. 15/678,015, Office Action mailed Aug. 18, 2020.
U.S. Appl. No. 15/490,691, Office Action mailed Oct. 1, 2020.
European Patent Application No. 18787932.5, Extended European Search Report, mailed Jan. 21, 2021, 10 pages.

* cited by examiner

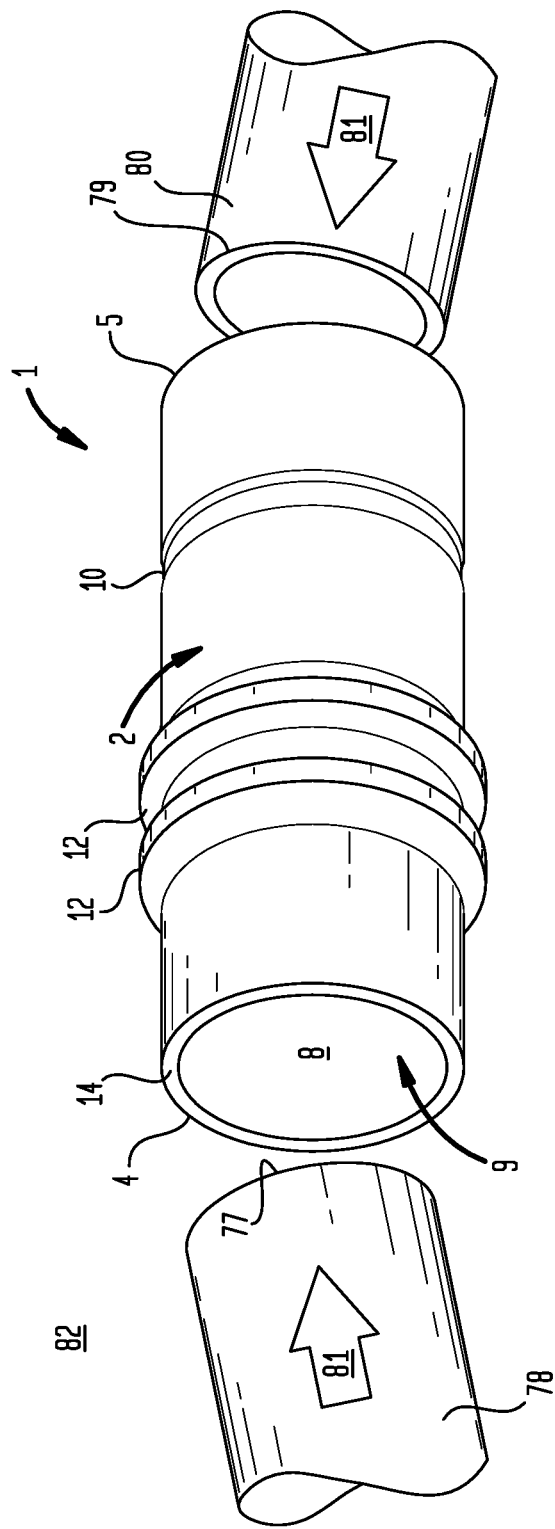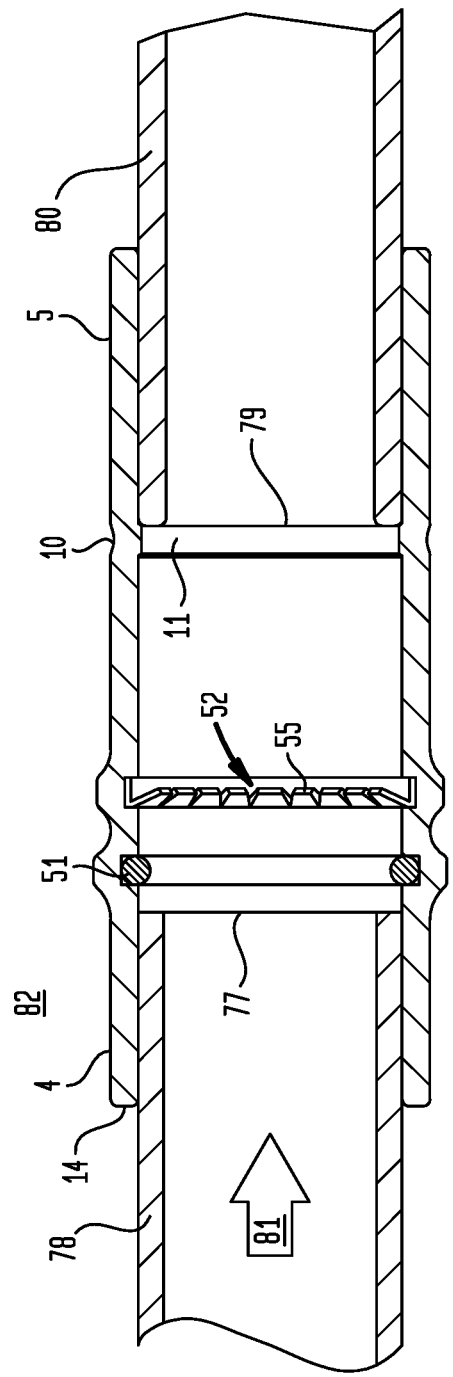

OIL AND GAS PIPE CONNECTOR

This United States Patent Application is a continuation of U.S. patent application Ser. No. 16/109,641, filed Aug. 22, 2018, now U.S. Pat. No. 11,560,972, issued Jan. 24, 2023, which is a continuation-in-part of U.S. patent application Ser. No. 15/678,015, filed Aug. 15, 2017, now U.S. Pat. No. 10,962,157, issued Mar. 30, 2020, which is a continuation-in-part of U.S. patent application Ser. No. 15/490,691, filed Apr. 18, 2017, now U.S. Pat. No. 11,060,646, issued Jul. 13, 2021, each hereby incorporated by reference herein.

I. FIELD OF THE INVENTION

Pipe connectors and methods of making and using pipe connectors to connect oil or gas pipe in oil and gas production, refining and distribution.

II. BACKGROUND OF THE INVENTION

In oil and gas production, refining, and distribution, a common method of connecting individual lengths of pipe may be by welding or fusing the pipe ends together.

However, the numerous and wide variety of oil and gas pipes correspondingly necessitate welding or fusion specifications that may vary depending on the type and dimensions of the pipes being joined.

The standards and dimensions of United State standard seamless pipes are defined by the American Society of Mechanical Engineers ("ASME") B36.10 for carbon and alloy steel pipes and by ASEM B36.19 for stainless and nickel alloy steel pipes and by the American Petroleum Institute ("PLI") 5 L for line pipes for oil and gas transmission and distribution.

The standards and dimensions of European seamless pipes are defined by European Standards ("EN") 10220 and EN 1127 specifications respectively for carbon/alloy and stainless steels and higher grades. Seamless pipes are available in ferrous and non-ferrous materials and in diameters of about one-eighth inch to about twenty-four inches in various pipe wall thicknesses.

The standards and dimensions of electric resistant welded pipes manufactured by welding steel coils longitudinally are defined by ASME B36.0 for carbon and alloy steel pipes and by ASME B36.19 for stainless and nickel-alloy steel pipes (or respectively by EN10220 and EN 1127) in a size range of about one-half inch (12.7 mm) to about 20 inches (508 mm) in various pipe wall thicknesses.

The standards and dimensions of plastic pipes manufactured of high density polyethylene ("HDPE") are defined by ASME B31.3 for chemicals and refineries and ASME B31.8 (EN 1555-2) for gas distribution in a size range of about one-half inch (12.7 mm) to about 24 inches (609.6 mm) in various pipe wall thicknesses.

For those installations utilizing metal-based pipes, butt-welding on oil and gas pipes requires that all the welding operations be performed from the outside. However, the weld must penetrate the entire thickness of the pipe ends to be joined from the external surface to the internal surface with a weld deposit that remains essentially defect free. For this reason, the pipe edges may require special preparation to bevel, face or groove the pipe edges.

Additionally, certain oil field waters containing salts and hydrogen sulfide are so corrosive that it is impracticable to employ steel pipe for carrying them. In these situations, it is common to employ a protective lining within the steel pipe to prevent these corrosive fluids from attacking the metal pipe. However, welding which fully penetrates the pipe wall can damage the protective lining.

Additionally, residual fluids or vapors often present in oil and gas pipe may present a hazardous situation in welding two pipe sections together. These residual fluids or vapors may be isolated from the welding site in a number of ways, such as inserting a large rubber plug into the exposed ends of the pipe. However, the plug is typically not removable and, when the pipe is put back into service, may become lodged or otherwise form a restriction or trash buildup in the pipe.

For those installations utilizing HDPE, a variant of butt-welding occurs using a heated plate referred to as butt fusion. During butt fusion, the ends of the pipes to be joined by butt fusion are concurrently heated with a heated plate until molten. The molten ends can be forced together at a controlled rate and pressure, and then held in place until the ends of the pipe have cooled to produce the butt fusion. However, in forcing the ends of the pipes together, an annular protuberance can distort the internal pipe surface at the butt fusion whereby the inner diameter of the pipes can be correspondingly decreased. The decrease in the inner diameter of the pipes at the location where the pipe ends are joined by butt fusion alters the fluid flow capacity of the joined pipes and fluid flow properties of fluids within the pipes.

Therefore, in the field of oil and gas production, refining, and distribution, there is a need for an oil and gas pipe connector to join the pipe ends of oil and gas pipe without the use of welding or fusion processes, and in particular butt-welding or butt fusion of pipe ends.

III. SUMMARY OF THE INVENTION

Accordingly, a broad object of the invention can be to provide a pipe connector for connecting oil or gas pipe, include plastic or metal oil or gas pipe or combinations thereof, including a tubular conduit having a length disposed between a pipe connector first second ends and a conduit wall thickness disposed between an external surface and an internal surface further including a seal element dimensioned to insertingly receive and fluidicly sealably engage pipe ends of oil and gas pipe and in particular embodiments having ASME or EN specifications or other specifications useful in oil and gas production, refining or distribution.

Another a broad object of the invention can be to provide method of making a pipe connector for connecting oil or gas pipe including a tubular conduit having a length disposed between a pipe connector first second ends and a conduit wall thickness disposed between an external surface and an internal surface further including a seal element dimensioned to insertingly receive and fluidicly sealably engage pipe ends of oil and gas pipe having ASME or EN specifications or other specifications useful in oil and gas production, refining or distribution.

Another broad object of the invention can be to provide a method in a pipe connector for connecting oil or gas pipe in which the pipe connector includes a tubular conduit having a length disposed between a first end and a second end, a conduit wall having a thickness disposed between an external surface and an internal surface dimensioned to insertingly receive and fluidicly sealably couple the pipe ends of oil and gas pipe whether having ASME or EN specifications or other dimensions of oil and gas pipe useful in oil and gas production, refining or distribution.

Naturally, further objects of the invention are disclosed throughout other areas of the specification, drawings, photographs, and claims.

III. BRIEF DESCRIPTION OF THE DRAWINGS

FIG. 18A is a cross sectional view 18A-18A of the particular embodiment of the coupler shown in FIG. 16.

FIG. 18B is an enlarged portion of the cross sectional view 18A-18A.

FIG. 18C is an enlarged portion of the cross sectional view 18A-18A.

FIG. 18D is an enlarged portion of the cross sectional view 18A-18A.

FIG. 25 illustrates a method of using a particular embodiment of a coupler in which a first pipe first end engages a coupler and a second pipe first end engages a coupler.

FIG. 26 is a cross section of a particular embodiment of a coupler having first and second pipe ends inserted into the interior passage of the coupler.

V. DETAILED DESCRIPTION OF THE INVENTION

Figure 1:
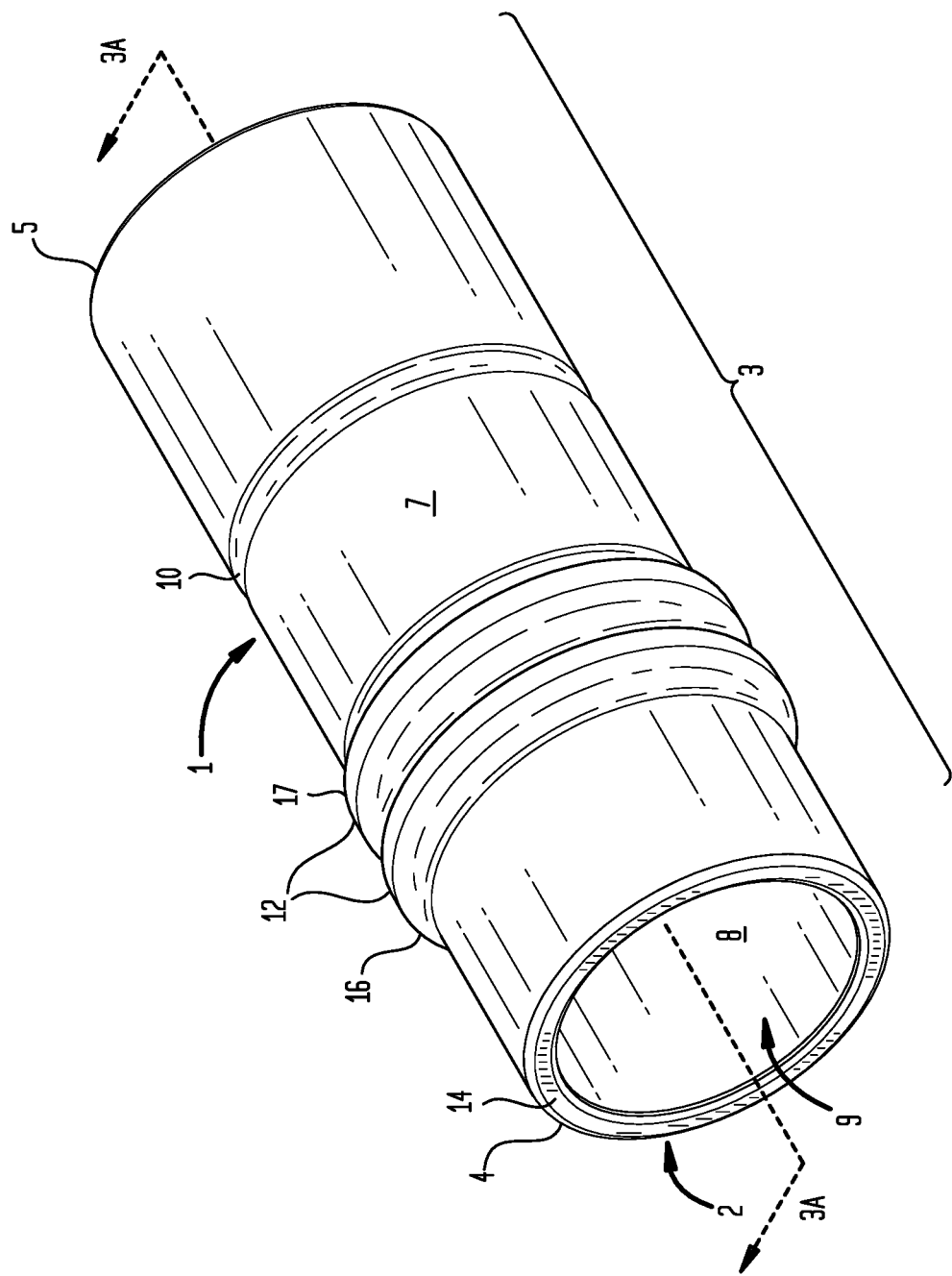
FIG. 1 is a perspective view of a particular embodiment of a coupler.
Figure 2:
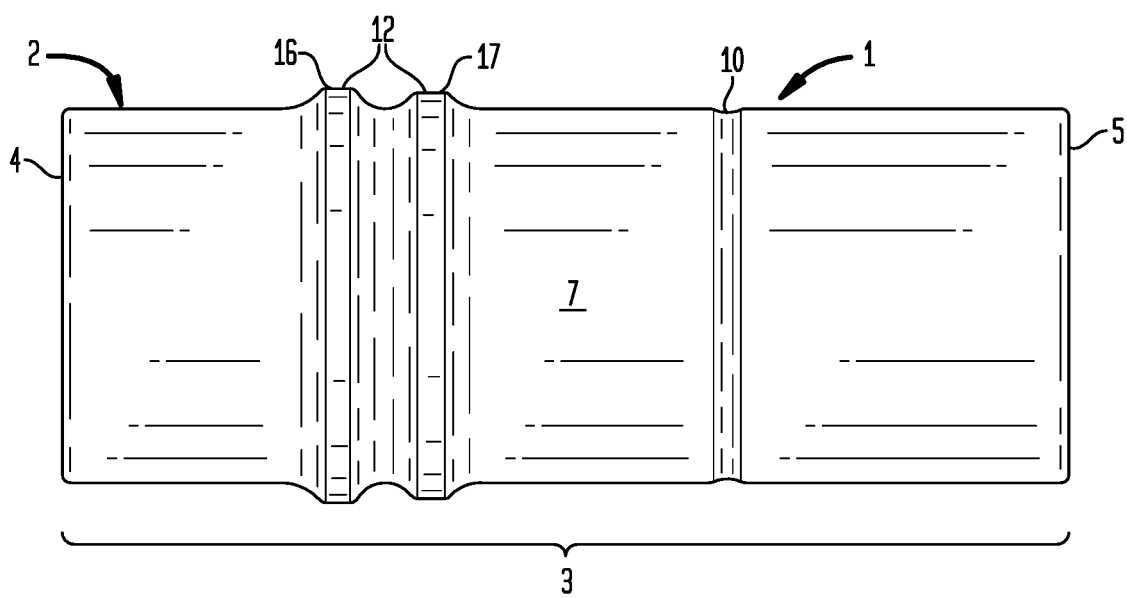
FIG. 2 is a side view of a particular embodiment of a coupler.
Figure 3:
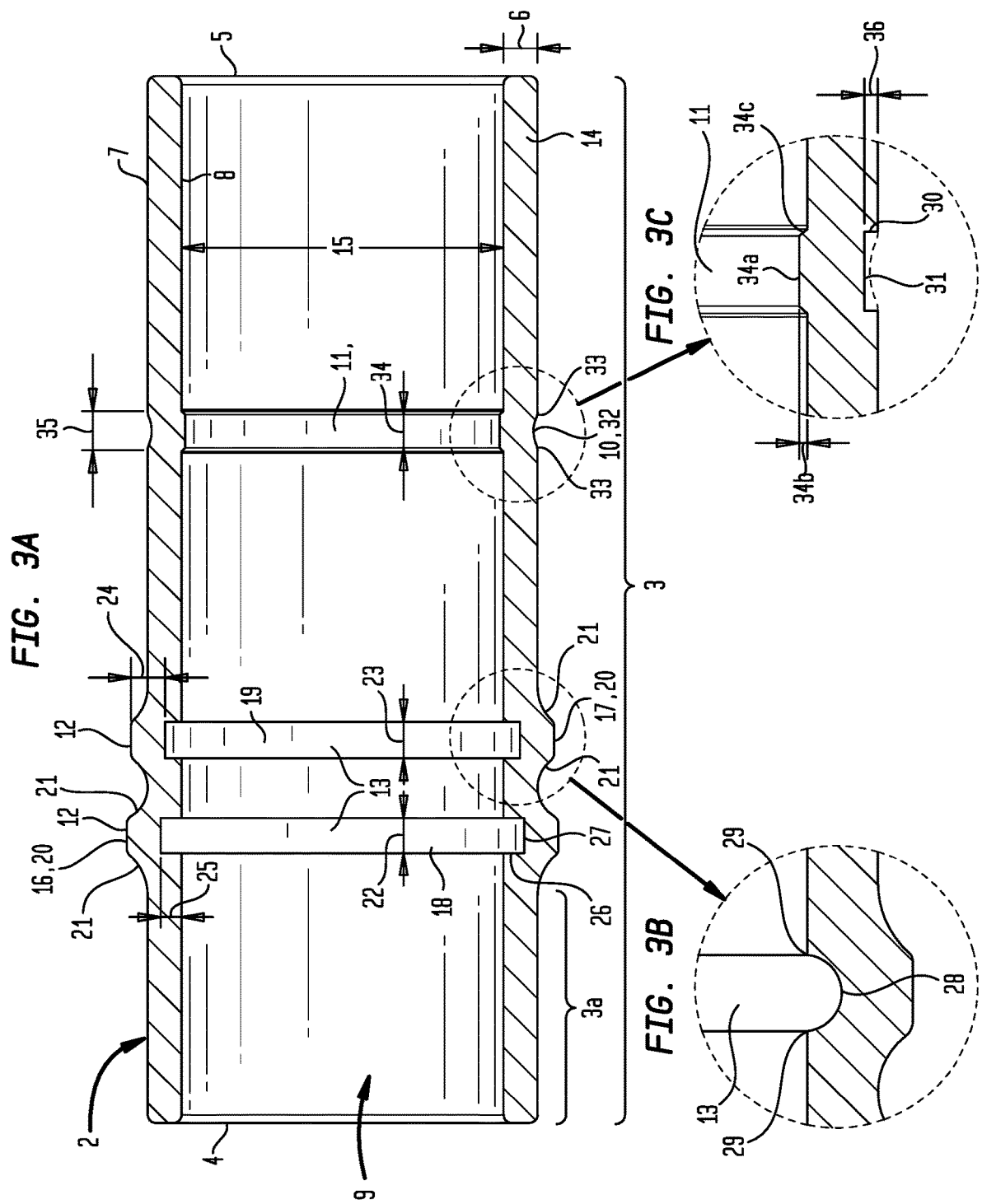
FIG. 3A is a cross sectional view 3A-3A of the particular embodiment of the coupler shown in FIG. 1.
FIG. 3B is an enlarged portion of the cross sectional view 3A-3A.
FIG. 3C is another enlarged portion of the cross sectional view 3A-3A.
Figure 4:
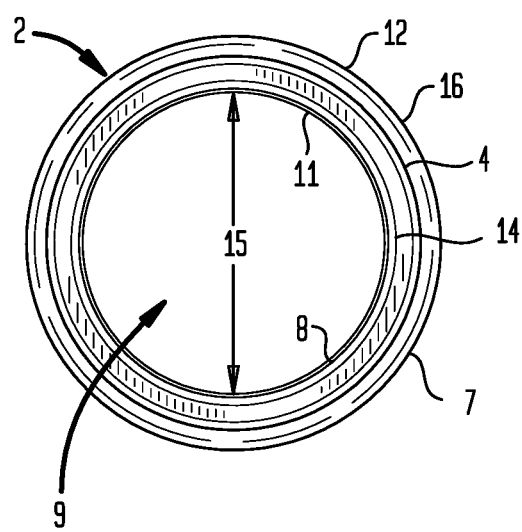
FIG. 4 is a first end view of a particular embodiment of a coupler.
Figure 5:
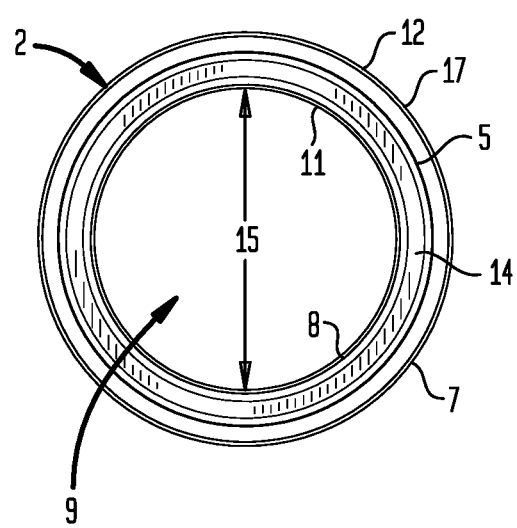
FIG. 5 is a second end view of a particular embodiment of a coupler.
Figure 6:
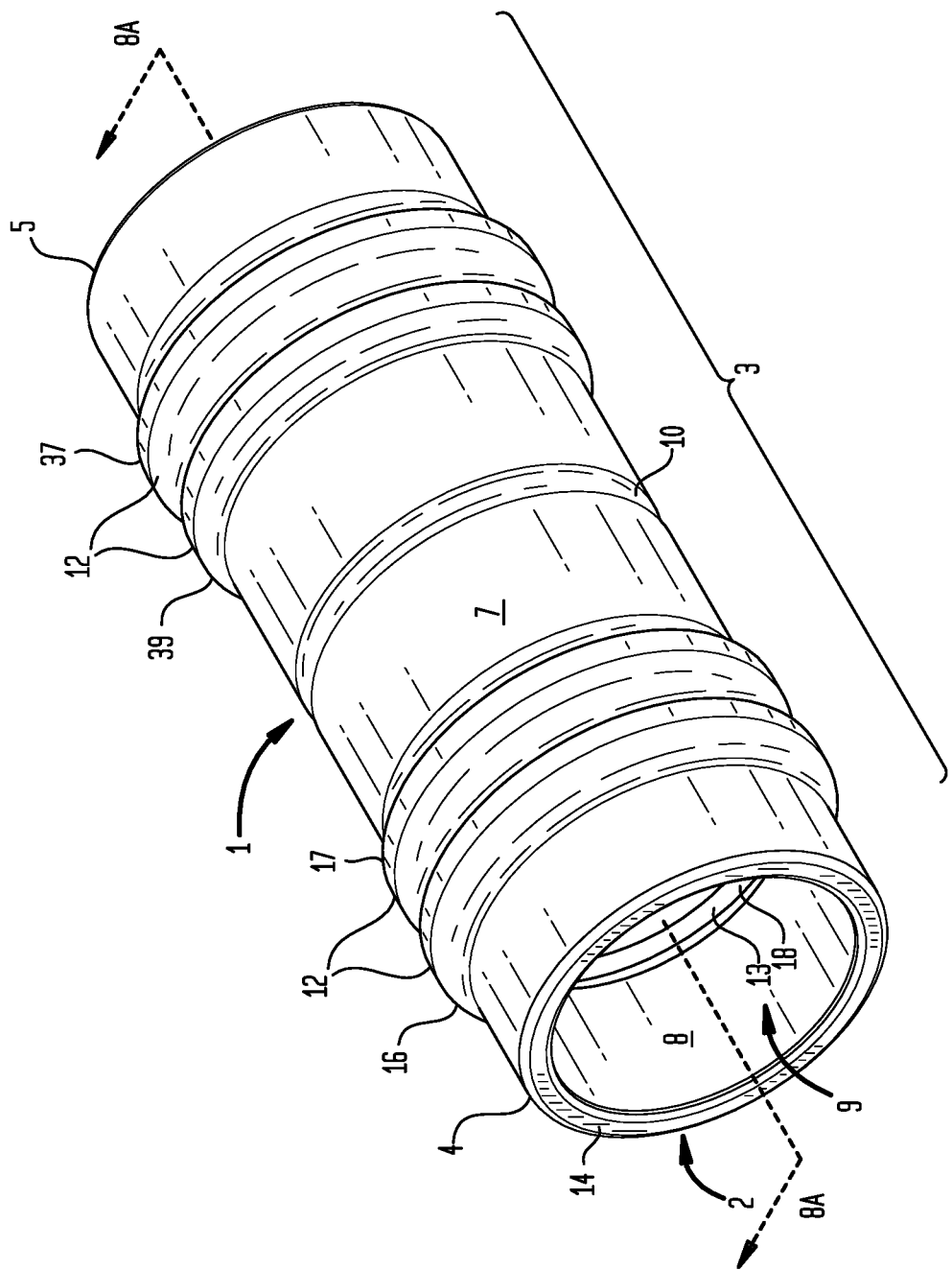
FIG. 6 is a perspective of another particular embodiment of a coupler.
Figure 7:
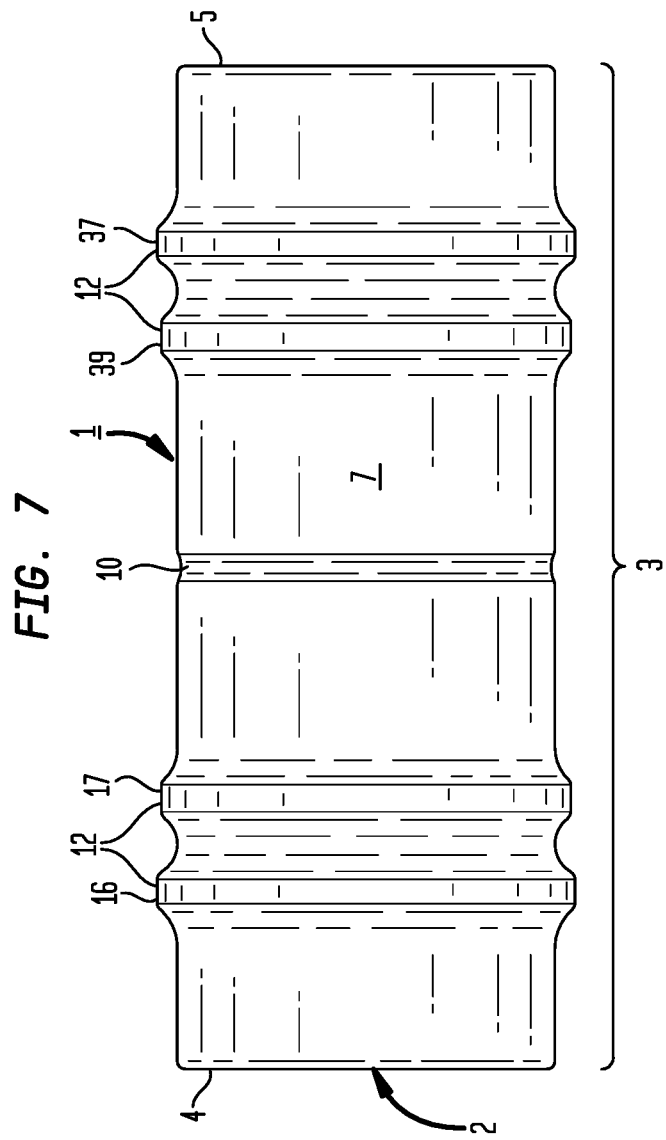
FIG. 7 is a side view of another particular embodiment of a coupler.

Generally referring to FIGS. 1 through 27 which illustrate embodiments of a pipe connector (1) to connect oil or gas pipe. In particular embodiments, the gas or oil pipe can, but need not necessarily be, one of plastic or metal pipe, or combinations thereof, used in the field of oil and gas production, refining, and distribution. In particular embodiments, the gas or oil pipe can, but need not necessarily, be made in accordance with ASME or EN specifications, and other specifications useful in oil and gas production, refining or distribution. ASME or EN specifications can include ASME B36.10, ASME B36.19, ASEM B36.0, ASME B36.19, ASME B31.3, ASME B31.8, EN 1555-2, EN10220, EN 1127, EN10220 and EN 1127. In particular embodiments of the pipe connector (1) can have dimensions correspondingly limited to receive and connect oil and gas pipes (as shown by the illustrative examples of FIGS. 25 and 26) meeting the ASME or EN specifications.

Typically, oil or gas pipe (80) or (81) has an outside diameter (82) of about four inches (101.6 mm) to about 25 inches (635 mm). In particular embodiments the oil or gas pipes (80) or (81) can have an outside diameter (82) selected from one or more of the group including or consisting of: about 114.3 millimeters, 117.5 millimeters, about 139.7 millimeters, about 159.0 millimeters, about 168.3, 177.8 millimeters, about 193.7 millimeters, about 203.0 millimeters, about 216.8 millimeters, about 217.8 millimeters, about 219.1 millimeters, about 229.0 millimeters, about 244.5 millimeters, about 273.0 millimeters, about 323.9 millimeters, about 339.7 millimeters, about 355.6 millimeters, about 382.0 millimeters, about 406.4 millimeters, about 419.0 millimeters, about 445.0 millimeters, about 457.2 millimeters, about 473.1 millimeters, about 508.0 millimeters, about 530.0 millimeters, and about 559.0 millimeters, about 610.0 millimeters. However, this is not meant to limit the range of outside diameters for the oil or gas pipes, which can be greater or smaller depending on the application.

Again, referring to FIGS. 1 through 27, embodiments of a pipe connector (1) (also referred to as a "coupler" or "connector") can include a tubular conduit (2) having a length (3) disposed between a first end (4) and a second end (5) and a thickness (6) disposed between an external surface (7) and an internal surface (8) which defines an interior passage (9). In particular embodiments, the pipe connector internal surface (8) can have a diameter adapted to receive oil or gas pipes (80) or (81) having and outside diameter of about four inches (101.6 mm) to about 25 inches (635 mm). In further particular embodiments, the pipe connector internal surface (8) can have a diameter adapted to receive and fluidically sealably engage oil or gas pipes (80) or (81) having said dimensions defined by one or more of: ASME B36.10, ASME B36.19, ASEM B36.0, ASME B36.19, ASME B31.3, ASME B31.8, EN 1555-2, EN10220, EN 1127, EN10220 and EN 1127.

In particular embodiments, the coupler can, but need not necessarily include, one or more of an external annular groove (10) disposed in the external surface (7) overlaying an internal annular member (11) disposed on the internal surface (8), and one or more external annular members (12) disposed on the external surface (7) correspondingly overlaying one or more internal annular grooves (13) disposed in said internal surface (8).

Again, generally referring to FIGS. 1 through 27, in particular embodiments, the tubular conduit (2) can have a length (3) disposed between a first end (4) and a second end (5) of between about 6.5 inches (165.1 millimeters) to about 8.5 inches (215.9 millimeters); however, it is not intended that this illustrative example, preclude embodiments that may have a greater or lesser length. In further particular embodiments, the length (3) of the tubular conduit (2) can be selected from the group including or consisting of: about 6.6 inches (167.6 mm) to about 6.8 inches (172.7 mm), about 6.7 inches (170.2 mm) to about 6.9 inches (175.3 mm), about 6.8 inches (172.7 mm) to about 7.0 inches (177.8 mm), about 6.9 inches (175.3 mm) to about 7.1 inches (180.3 mm), about 7.0 inches (177.8 mm) to about 7.2 inches (182.9 mm), about 7.1 inches (180.3 mm) to about 7.3 inches (185.4 mm), about 7.2 inches (182.9 mm) to about 7.4 inches (188.0 mm), about 7.3 inches (185.4 mm) to about 7.5 inches (190.5 mm), about 7.4 inches (188.0 mm) to about 7.6 inches (193.0 mm), about 7.5 inches (190.5 mm) to about 7.7 inches (195.6 mm), about 7.6 inches (193.0 mm) to about 7.8 inches (198.1 mm), about 7.7 inches (195.6 mm) to about 7.9 inches (200.7 mm), about 7.8 inches (198.1 mm) to about 8.0 inches (203.2 mm), about 7.9 inches (200.7 mm) to about 8.1 inches (205.7 mm), about 8.0 inches (203.2 mm) to about 8.2 inches (208.3 mm), about 8.1 inches (205.7 mm) to about 8.3 inches (210.8 mm), about 8.2 inches (208.3 mm) to about 8.4 inches (213.4 mm), and combinations thereof.

Again, referring generally to FIGS. 1 through 27, the tubular conduit (2) can include a conduit wall (14)(also referred to as "a pipe connector wall") having a thickness (6) disposed between an external surface (7) and an internal surface (8). In particular embodiments, the thickness (6) of the conduit wall (14) can, but need not necessarily, be about 0.15 inches (3.8 millimeters) to about 0.35 inches (8.9 millimeters). In further particular embodiments, the thickness (6) of the conduit wall (14) can be selected from the group including or consisting of: about 0.16 inches (4.1 mm) to about 0.2 inches (5.1 mm), about 0.175 inches (4.4 mm) to about 0.225 inches (5.7 mm), about 0.2 inches (5.1 mm) to about 0.25 inches (6.4 mm), about 0.225 inches (5.7 mm) to about 0.275 inches (7.0 mm), about 0.25 inches (6.4 mm) to about 0.3 inches (7.6 mm), about 0.275 inches (7.0 mm) to about 0.325 inches (8.3 mm), about 0.3 inches (7.6 mm) to about 0.34 inches (8.6 mm), and combinations thereof; however, this is not intended to preclude embodiments having a greater or lesser thickness.

Again, referring primarily to FIGS. 1 through 27, the internal surface (8) of the tubular conduit (2) can define an interior passage (9) communicating between the first and second ends (4)(5). In particular embodiments, as shown in the examples of FIGS. 4, 5, 9, and 10, the tubular conduit (2) can, but need not necessarily, have a generally cylindrical internal surface (8). The interior passage (9) can have a diameter (15) of about 0.5 inch (12.7 millimeters) to about 4.5 inches (114.3 millimeters). In further particular embodiments, the diameter (15) can be selected from the group including or consisting of: about 0.75 inches (19.1 mm) to about 1.25 inches (31.8 mm), about 1.0 inches (25.4 mm) to about 1.5 inches (38.1 mm), about 1.25 inches (31.8 mm) to about 1.75 inches (44.5 mm), about 1.5 inches (38.1 mm) to about 2.0 inches (50.8 mm), about 1.75 inches (44.5 mm) to about 2.25 inches (57.2 mm), about 2.0 inches (50.8 mm) to about 2.5 inches (63.5 mm), about 2.25 inches (57.2 mm) to about 2.75 inches (69.9 mm), about 2.5 inches (63.5 mm) to about 3.0 inches (76.2 mm), about 2.75 inches (69.9 mm) to about 3.25 inches (82.6 mm), about 3.0 inches (76.2 mm) to about 3.5 inches (88.9 mm), about 3.25 inches (82.6 mm) to about 3.75 inches (95.3 mm), about 3.5 inches (88.9 mm) to about 4.0 inches (101.6 mm), about 3.75 inches (95.3 mm) to about 4.25 inches (108.0 mm), and combinations thereof; however, this is not intended to preclude embodiments that have a greater or lesser diameter (15).

Embodiments of the tubular conduit (2) can be produced from a wide variety of materials. As illustrative examples, the tubular conduit (2) can be produced from a material selected from the group including or consisting of: a metal, such as, copper or aluminum, concrete, a plastic, such as, polyvinyl chloride, acrylonitrile butadiene styrene, polyethylene, polypropylene, and combinations thereof; however, these illustrative examples are not intended to preclude embodiments produced from other materials. In particular embodiments, the tubular conduit (2) can be produced from a transparent, translucent, semi-opaque, or opaque material. The internal surface (8), external surface (7), or both, can have the same or different surface roughness or surface finish.

Figure 8:
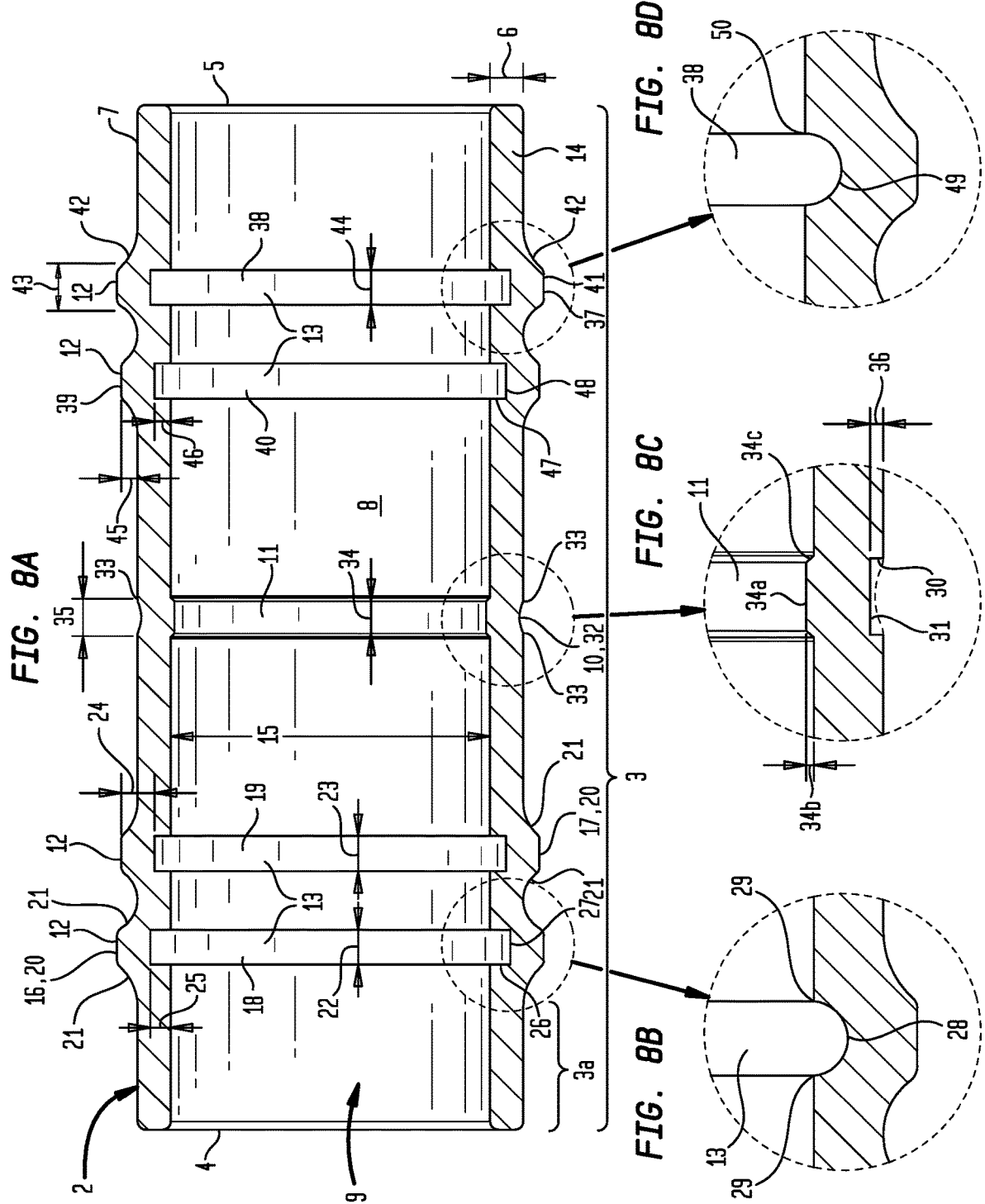
FIG. 8A is a cross sectional view 8A-8A of the particular embodiment of the coupler shown in FIG. 6.
FIG. 8B is an enlarged portion of the cross sectional view 8A-8A.
FIG. 8C is another enlarged portion of the cross sectional view 8A-8A.
FIG. 8D is another enlarged portion of the cross sectional view 8A-8A.
Figure 9:
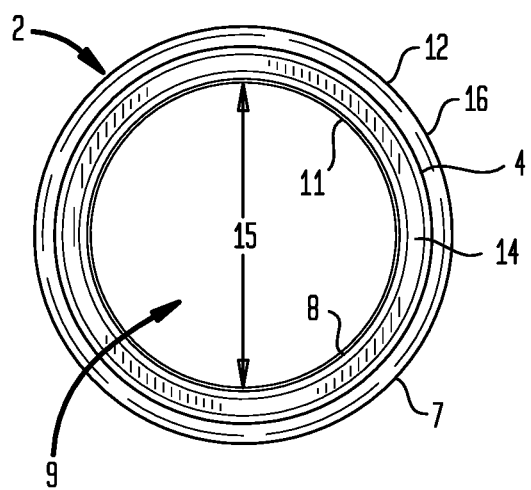
FIG. 9 is a first end view of another particular embodiment of a coupler.
Figure 10:
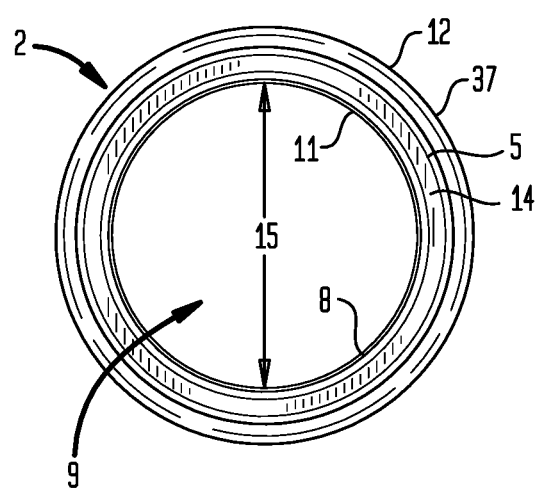
FIG. 10 is a second view of another particular embodiment of a coupler.
Figure 11:
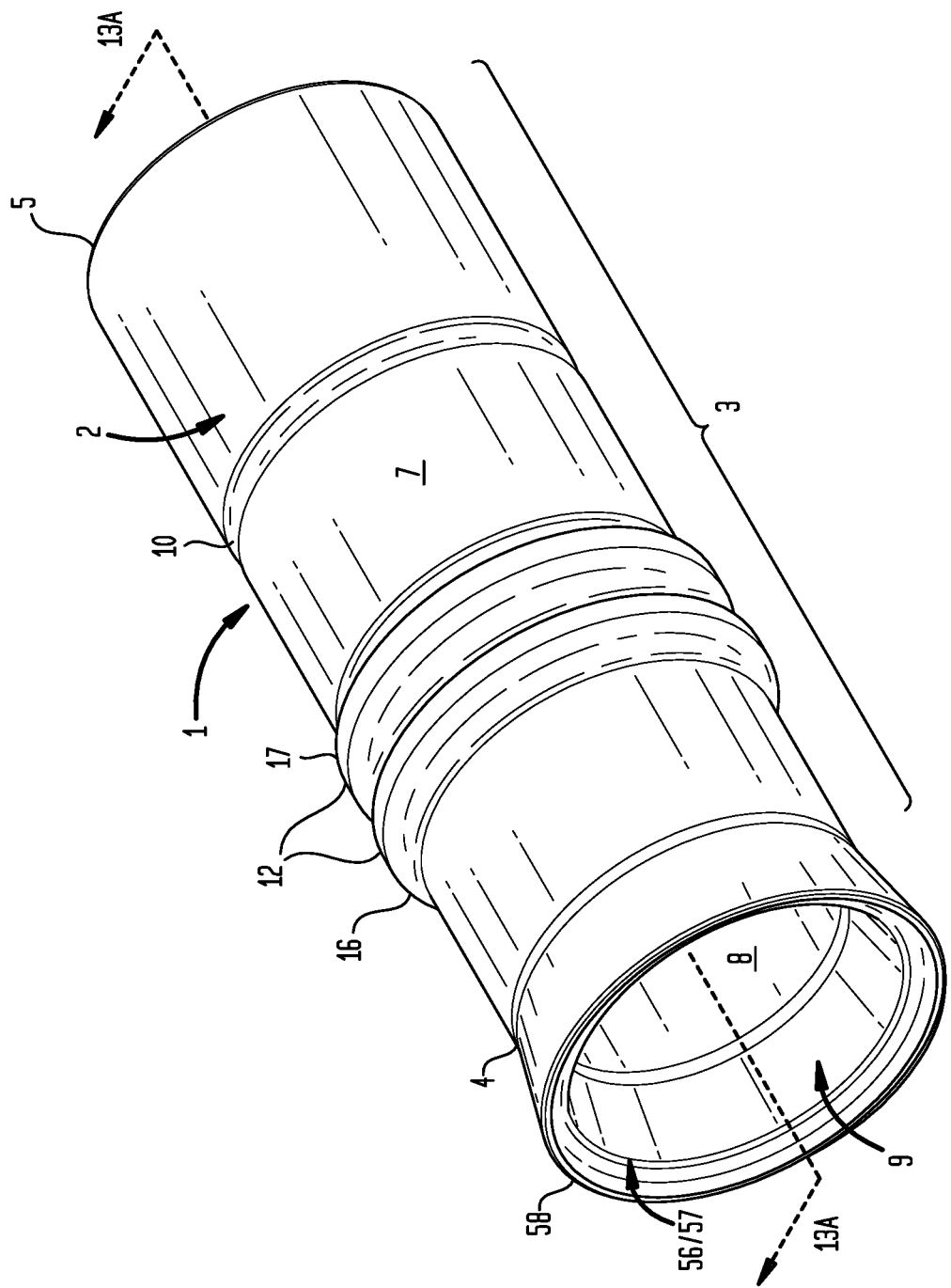
FIG. 11 is a perspective view of a particular embodiment of a coupler having a tubular guide.
Figure 12:
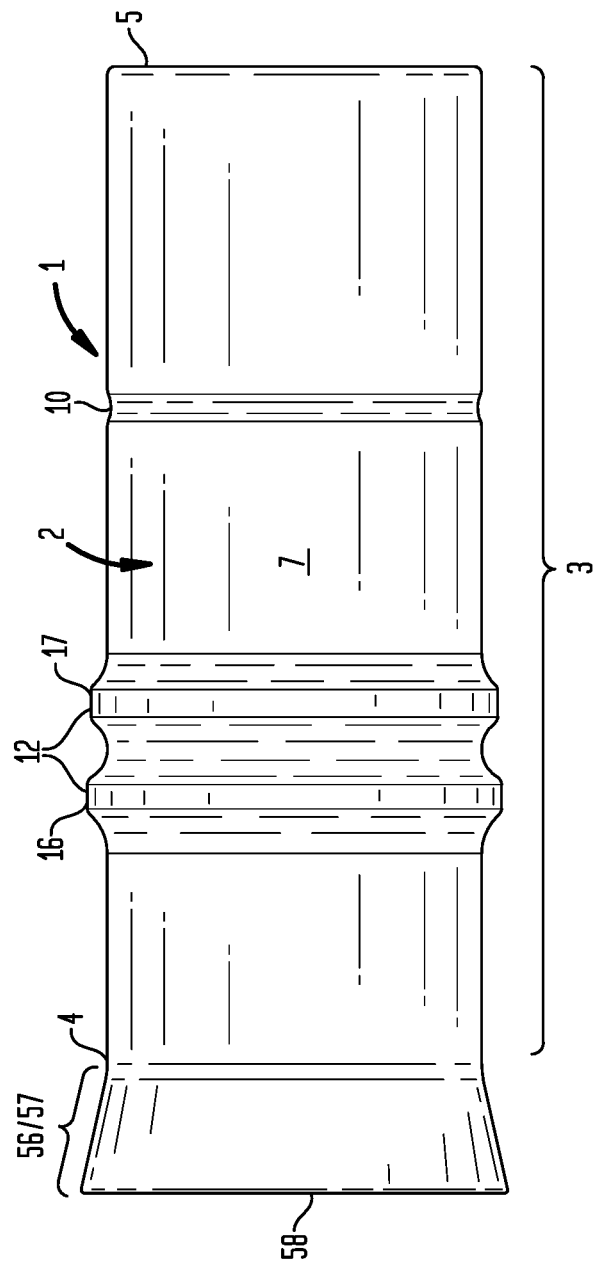
FIG. 12 is a side view of a particular embodiment of a coupler having a tubular guide.
Figure 13:
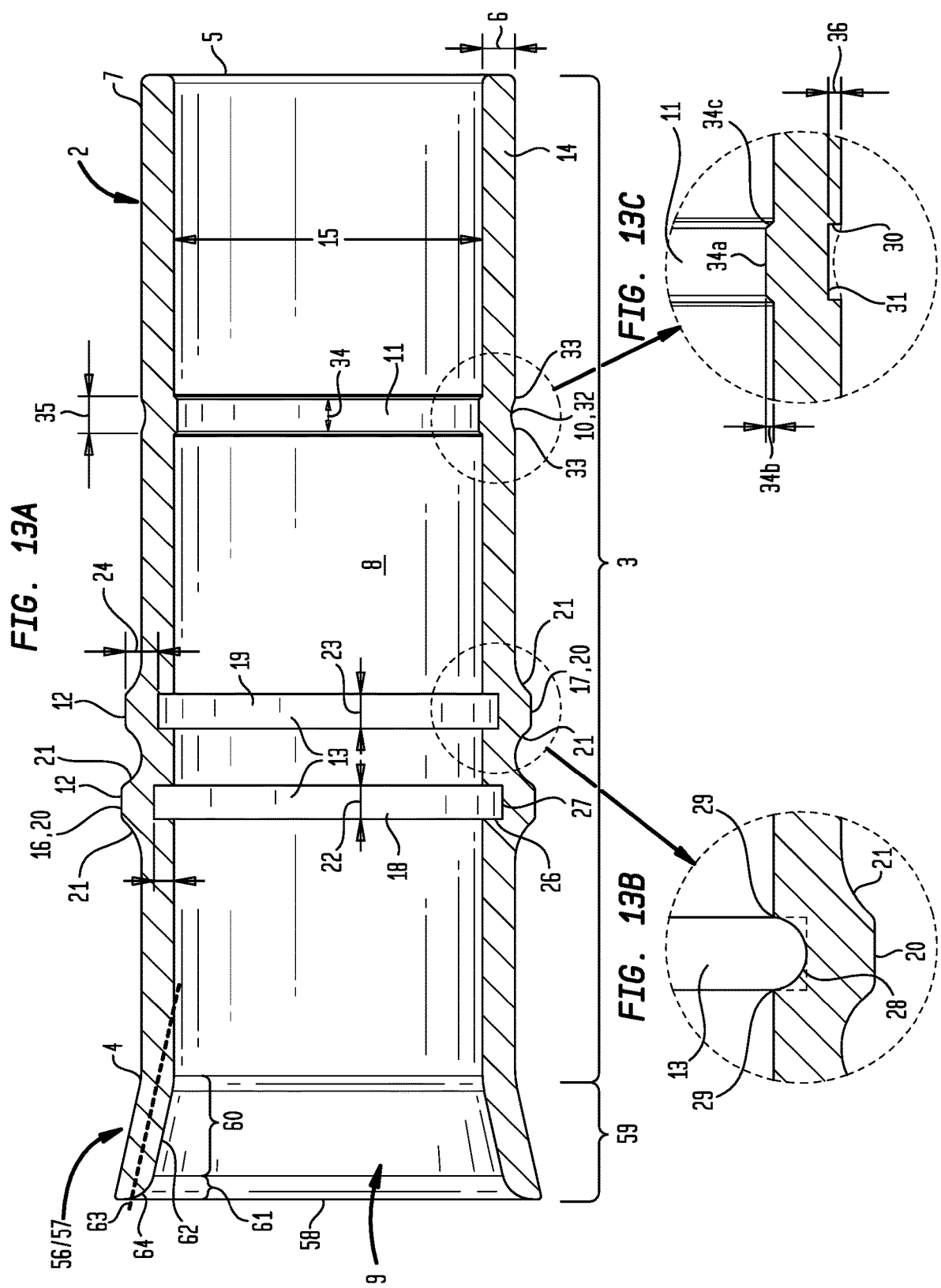
FIG. 13A is a cross sectional view 13A-13A of the particular embodiment of the coupler shown in FIG. 11.
FIG. 13B is an enlarged portion of the cross sectional view 13A-13A.
FIG. 13C is another enlarged portion of the cross sectional view 13A-13A.
Figure 14:
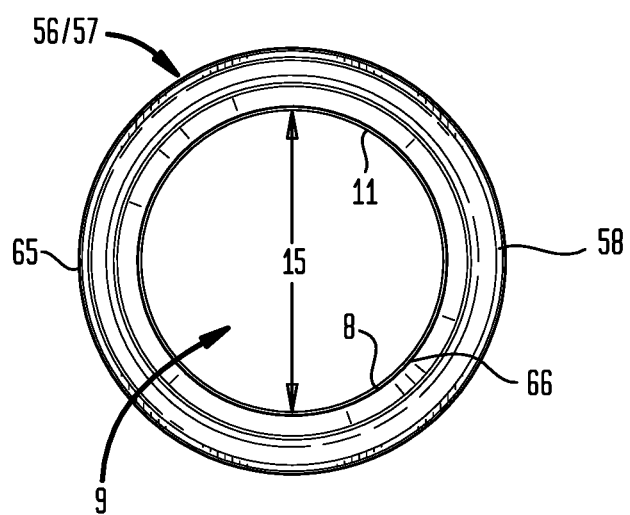
FIG. 14 is a first end view of a particular embodiment of a coupler having a tubular guide.
Figure 15:
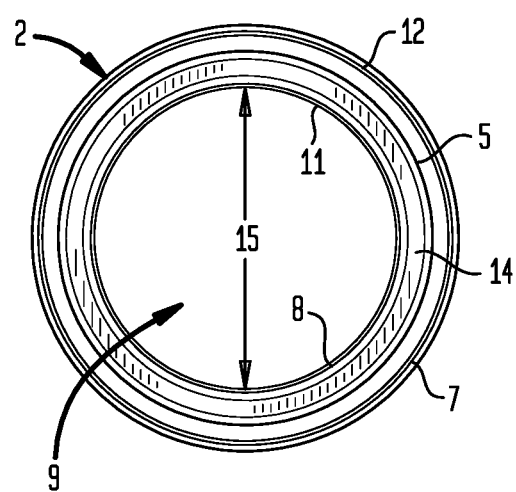
FIG. 15 is a second end view of a particular embodiment of a coupler having a tubular guide.
Figure 16:
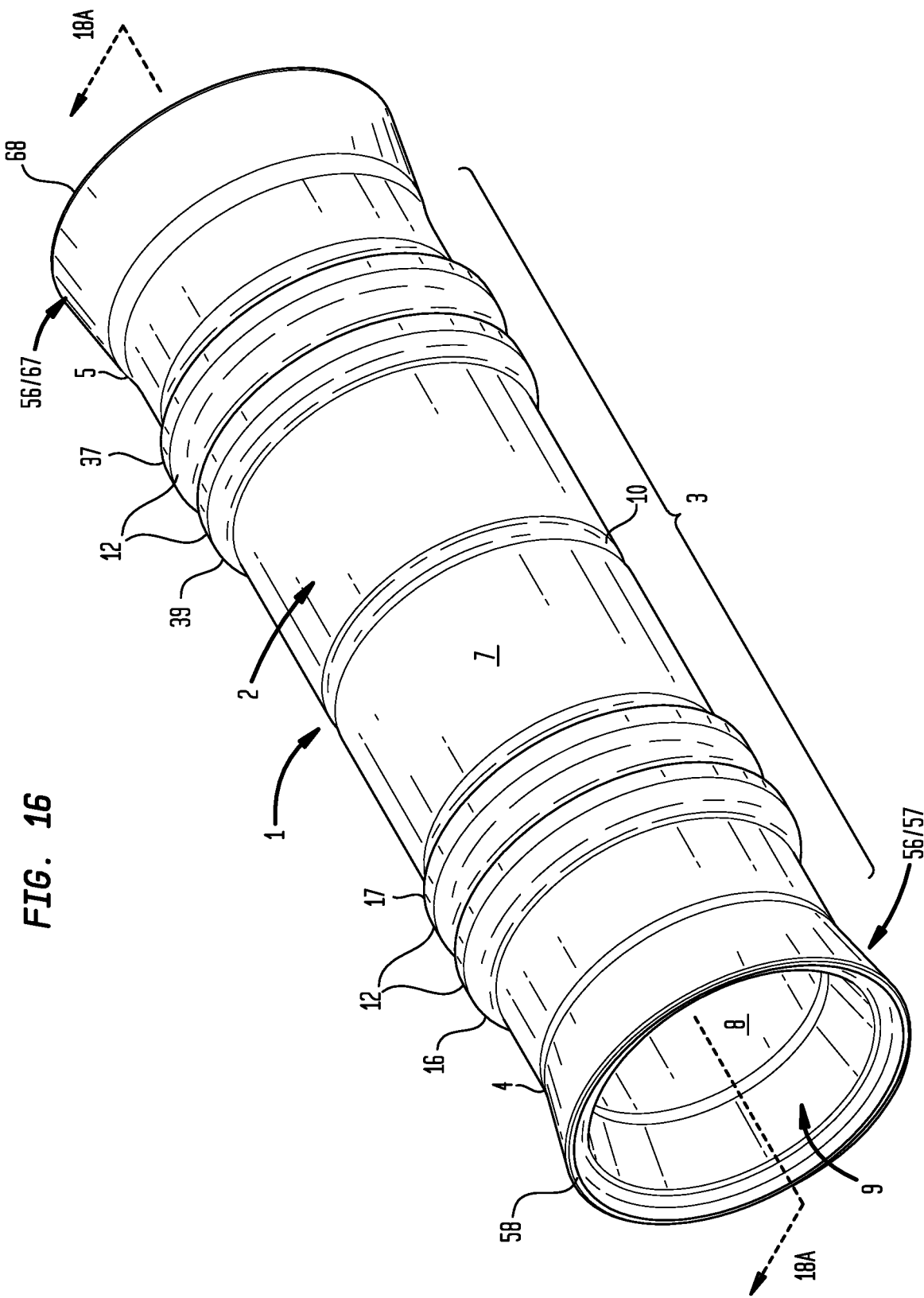
FIG. 16 is a perspective of another particular embodiment of a coupler having a tubular guide.
Figure 17:
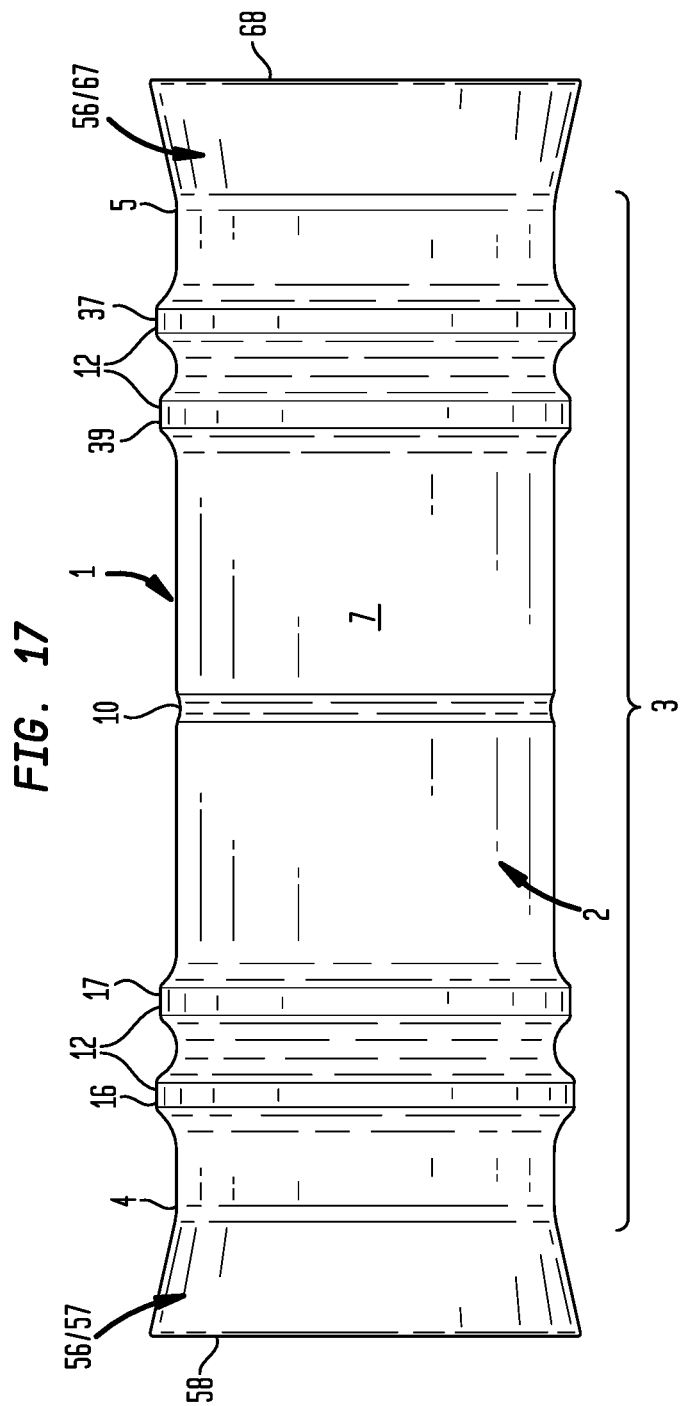
FIG. 17 is a side view of another particular embodiment of a coupler having a tubular guide.
Figure 19:
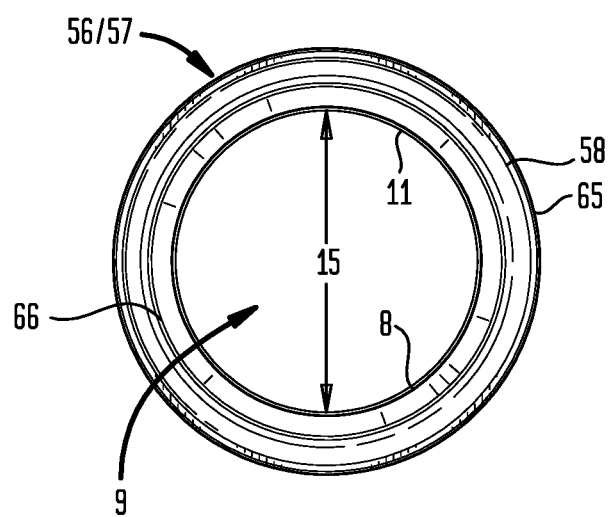
FIG. 19 is a first end view of another particular embodiment of a coupler having a tubular guide.
Figure 20:
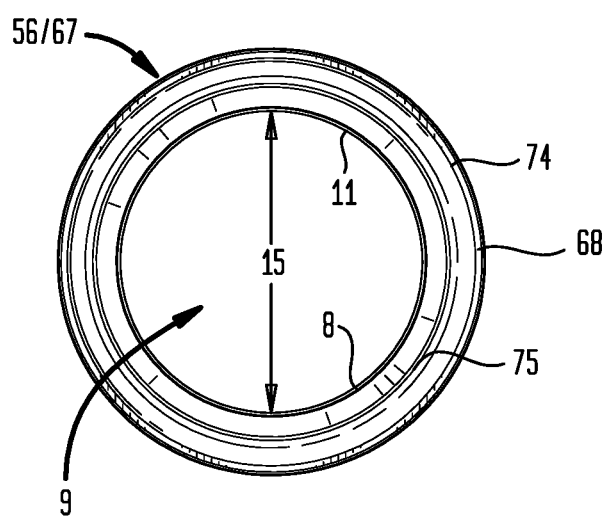
FIG. 20 is a second end view of another particular embodiment of a coupler having a tubular guide.

Now referring generally to FIGS. 1 through 27, particular embodiments of a coupler (1) can, but need not necessarily, include one or more external annular members (12). As to particular embodiments, a first external annular member (16) can be circumferentially disposed on the external surface (7) of the tubular conduit (2). As to particular embodiments, a second external annular member (17) can be circumferentially disposed on the external surface (7) of the tubular conduit (2). In particular embodiments, the first external annular member (16) can overlay a first internal annular groove (18) circumferentially disposed in the internal surface (8) of the tubular conduit (2). As to particular embodiments, a first and second external annular member (16)(17) can correspondingly overlay a first and second internal annular groove (18)(19) circumferentially disposed in axial spaced apart relation on the internal surface (8) of the tubular conduit (2) (as shown in the examples of FIGS. 8A and 13A). In particular embodiments, the first external annular member (16) overlaying the first internal annular groove (18) and the second external annular member (17) overlaying the second internal annular groove (19) can further be disposed in axial spaced apart relation on the external surface (7) of the tubular conduit (2) proximate the first end (4) (as shown in the illustrative examples of FIGS. 1 through 5). In further particular embodiments, the first external annular member (16) overlaying the first internal annular groove (18) can be disposed a lesser distance from the first end (4) than the second external annular member (17) overlaying the second internal annular groove (19).

Now referring primarily to FIGS. 3A, 8A, 13A and 18A, in particular embodiments, each of the first or second external annular members (16)(17) can be configured to have a crown (20) disposed at a height (24) outward of the external surface (7) of the tubular conduit (2). Each of the first and second annular members (16)(17) can have annular member sides (21) which can, but need not necessarily, taper from the crown (20) towards the external surface (7). In other particular embodiments, each of the annular member sides (21) can, but need not necessarily, extend orthogonally between the crown and the external surface (7). In particular embodiments, the width (22) of the crown (20) can be substantially equal to a width (23) of the corresponding first or second internal annular grooves (18)(19). In particular embodiments, the height (24) of the crown (20) of the first or second external annular members (16)(17) can be between about 1.0 times and about 2.0 times that of the depth (25) of the corresponding first and second internal annular grooves (18)(19).

In particular embodiments, each of the first and second internal annular grooves (18)(19) can, but need not necessarily, be configured to have two annular groove sides (26) disposed orthogonal to the bottom (27) of each of the respective first and second internal annular grooves (18) (19), as shown in the examples of FIGS. 3A, 8A, 13A, and 18A. In further particular embodiments, each of the first and second internal annular grooves (18)(19) can, but need not necessarily, be configured as an arcuate bottom (28) disposed between the edges (29) of the respective first and second internal annular grooves (18)(19), as shown in the examples of FIGS. 3B and 8B.

Now referring primarily to FIGS. 1, 3A, 3C, 6, 8A, 8C, 11, 13A, 13C, 16, 18A, and 18C, in particular embodiments of a coupler (1), an external annular groove (10) can be circumferentially disposed on the external surface (7) of the tubular conduit (2) to overlay an internal annular member (11) circumferentially disposed on the internal surface (8) of the tubular conduit (2). The external annular groove (10) can, but need not necessarily, be configured to have two annular groove sides (30) disposed orthogonal to a bottom (31) of the external annular groove (10), as shown in the examples of FIGS. 3C, 8C, 13C, and 18C. In further particular embodiments, the external annular groove (10) can, but need not necessarily, be configured as a single arcuate annular groove (32) disposed between the edges (33) of the external annular groove (10), as shown in the examples of FIGS. 3A, 8A, 13A and 18A.

Now referring primarily to FIGS. 3A, 8A, 13A, and 18A, in particular embodiments, the internal annular member (11) can dispose a crown (34a) at a height (34b) inward of the internal surface (8) of the tubular conduit (2). Each internal annular member side (34c) of the internal annular member (11) can, but need not necessarily, taper from the crown (20) towards the internal surface (8). In other particular embodiments, each internal annular member side (34c) of the internal annular member (11) can, but need not necessarily, be orthogonal to the internal surface (8). The height (34b) of the internal annular member (11) at the crown (34a) can be between about 1.0 times and about 2.0 times that of the depth (36) of the external annular groove (10). In particular embodiments, the width (34) of the crown (34a) can be substantially equal to the width (35) of the external annular groove (10). The external annular groove (10) overlaying the internal annular member (11) can further, but need not necessarily, be disposed proximate the second end (5) of the tubular conduit (2).

Now referring primarily to FIGS. 3A and 8A, in particular embodiments, the internal surface (8) of the tubular conduit (2) can, but need not necessarily, taper (3A) as the internal surface (8) approaches the first internal annular groove (18) from the first end (4) of the tubular conduit (2). The internal surface (8) can taper about 0.01 inches (0.254 millimeters) to about 0.03 inches (0.762 millimeters) between the first end (4) and the first internal annular groove (18); however, this is not intended to preclude embodiments which taper (3A) to a greater or lesser degree. In further particular embodiments, the taper of the internal surface (8) between the first end (4) and the first internal annular groove (18) can be selected from the group including or consisting of: about 0.012 inches (0.30 mm) to about 0.014 inches (0.36 mm), about 0.013 inches (0.33 mm) to about 0.015 inches (0.38 mm), about 0.014 inches (0.36 mm) to about 0.016 inches (0.41 mm), about 0.015 inches (0.38 mm) to about 0.017 inches (0.43 mm), about 0.016 inches (0.41 mm) to about 0.018 inches (0.46 mm), about 0.017 inches (0.43 mm) to about 0.019 inches (0.48 mm), about 0.018 inches (0.46 mm) to about 0.020 inches (0.51 mm), about 0.019 inches (0.48 mm) to about 0.021 inches (0.53 mm), about 0.020 inches (0.51 mm) to about 0.022 inches (0.56 mm), about 0.021 inches (0.53 mm) to about 0.023 inches (0.58 mm), about 0.022 inches (0.56 mm) to about 0.024 inches (0.61 mm), about 0.023 inches (0.58 mm) to about 0.025 inches (0.64 mm), about 0.024 inches (0.61 mm) to about 0.026 inches (0.66 mm), about 0.025 inches (0.64 mm) to about 0.027 inches (0.69 mm), about 0.026 inches (0.66 mm) to about 0.028 inches (0.71 mm), about 0.027 inches (0.69 mm) to about 0.029 inches (0.74 mm), and combinations thereof.

Referring generally to FIGS. 6 through 10 and 16 through 20, particular embodiments of a coupler (1) can further include a third external annular member (37) circumferentially disposed on the external surface (7) of the tubular conduit (2) and overlaying a third internal annular groove (38) circumferentially disposed in the internal surface (8) of the tubular conduit (2). Additionally, a fourth external annular member (39) can be circumferentially disposed on the external surface (7) of the tubular conduit (2) and overlaying a fourth internal annular groove (40) circumferentially disposed in the internal surface (8) of the tubular conduit (2). The third and fourth external annular members (37)(39) correspondingly overlaying the third and fourth internal annular grooves (38)(40) can be disposed in axial spaced apart relation on the external surface (7) of the tubular conduit (2) proximate the second end (5). The third external annular member (37) overlaying the third internal annular groove (38) can be disposed a lesser distance from the second end (5) than the fourth external annular member (39) overlaying the fourth internal annular groove (40). In particular embodiments, the external annular groove (10) overlaying the internal annular member (11) can be medially disposed on the tubular conduit (2) between the second external annular member (17) and the fourth external annular member (39).

Figures 18A, 18B, 18C, 18D:
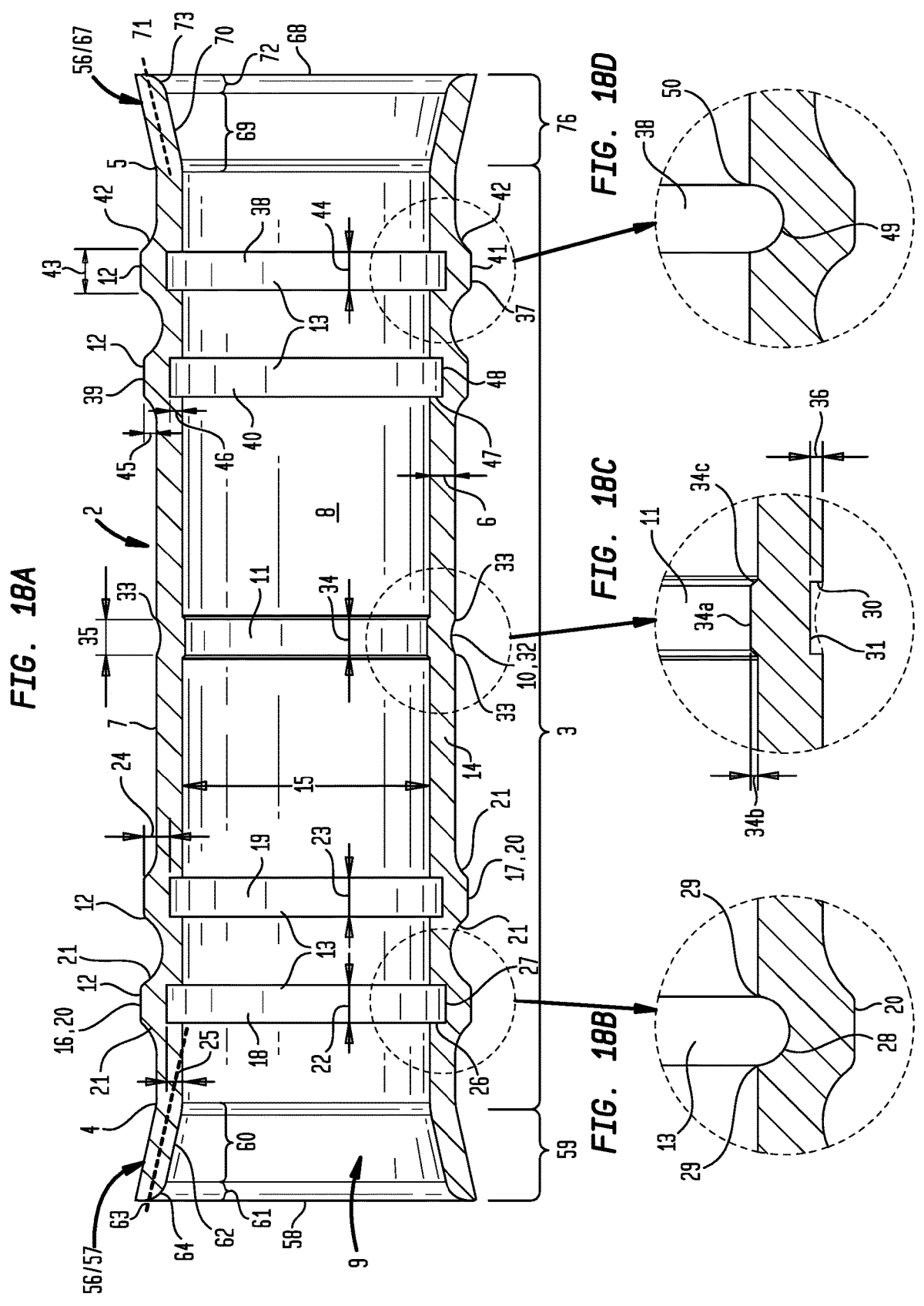

Now referring primarily to FIGS. 8A and 18A, in particular embodiments, each of the third and fourth external annular members (37)(39) can have a crown (41) disposed outward from the external surface (7). Each external annular member side (42) of the third and fourth external annular members (37)(39) can, but need not necessarily, taper towards the external surface (7). In other particular embodiments, each external annular member side (42) of the third and fourth external annular members (37)(39) can, but need not necessarily, be disposed orthogonal to the external surface (7). The height (45) of the crown (41) of the third and fourth external annular members (37)(39) can be between about 1.0 times and about 2.0 times that of the depth (46) of the corresponding third and fourth internal annular grooves (38)(40). In particular embodiments, the width (43) of the crown (41) can be substantially equal to a width (44) of the corresponding third and fourth internal annular grooves (38)(40). However, these illustrative examples of the height (45) and width (44) of the crown (41) are not intended to preclude embodiments having a greater or lesser height (45) or width (44).

Again referring primarily to FIGS. 8A and 18A, in particular embodiments, each of the third and fourth internal annular grooves (38)(40) can, but need not necessarily, have a pair of groove sides (47) orthogonally joined to the bottom (48) of each of the respective third and fourth internal annular grooves (38)(40). In further particular embodiments, each of the third and fourth internal annular grooves (38) (40) can, but need not necessarily, be configured as an arcuate bottom (49) disposed between the edges (50) of the respective third and fourth internal annular grooves (38) (40), as shown in the example of FIGS. 8D and 18D.

In particular embodiments, the first internal annular groove (18), the second internal annular groove (19), the third internal annular groove (38), the fourth internal annular groove (40), and the external annular groove (10) can each have a depth (25)(36)(46) of about 0.1 inches (2.54 millimeters) to about 0.3 inches (7.62 millimeters). In further particular embodiments, the depth (25)(36)(46) of the first internal annular groove (18), the second internal annular groove (19), the third internal annular groove (38), the fourth internal annular groove (40), and the external annular groove (10) can be selected from the group including or consisting of: about 0.12 inches (3.1 mm) to about 0.14 inches (3.6 mm), about 0.13 inches (3.3 mm) to about 0.15 inches (3.8 mm), about 0.14 inches (3.6 mm) to about 0.16 inches (4.1 mm), about 0.15 inches (3.8 mm) to about 0.17 inches (4.3 mm), about 0.16 inches (4.1 mm) to about 0.18 inches (4.6 mm), about 0.17 inches (4.3 mm) to about 0.19 inches (4.8 mm), about 0.18 inches (4.6 mm) to about 0.2 inches (5.1 mm), about 0.19 inches (4.8 mm) to about 0.21 inches (5.3 mm), about 0.2 inches (5.1 mm) to about 0.22 inches (5.6 mm), about 0.21 inches (5.3 mm) to about 0.23 inches (5.8 mm), about 0.22 inches (5.6 mm) to about 0.24 inches (6.1 mm), about 0.23 inches (5.8 mm) to about 0.25 inches (6.4 mm), about 0.24 inches (6.1 mm) to about 0.26 inches (6.6 mm), about 0.25 inches (6.4 mm) to about 0.27 inches (6.9 mm), about 0.26 inches (6.6 mm) to about 0.28 inches (7.1 mm), about 0.27 inches (6.9 mm) to about 0.29 inches (7.4 mm), and combinations thereof. These illustrative examples are not intended to preclude embodiments having a greater or lesser groove depth.

Figure 21:
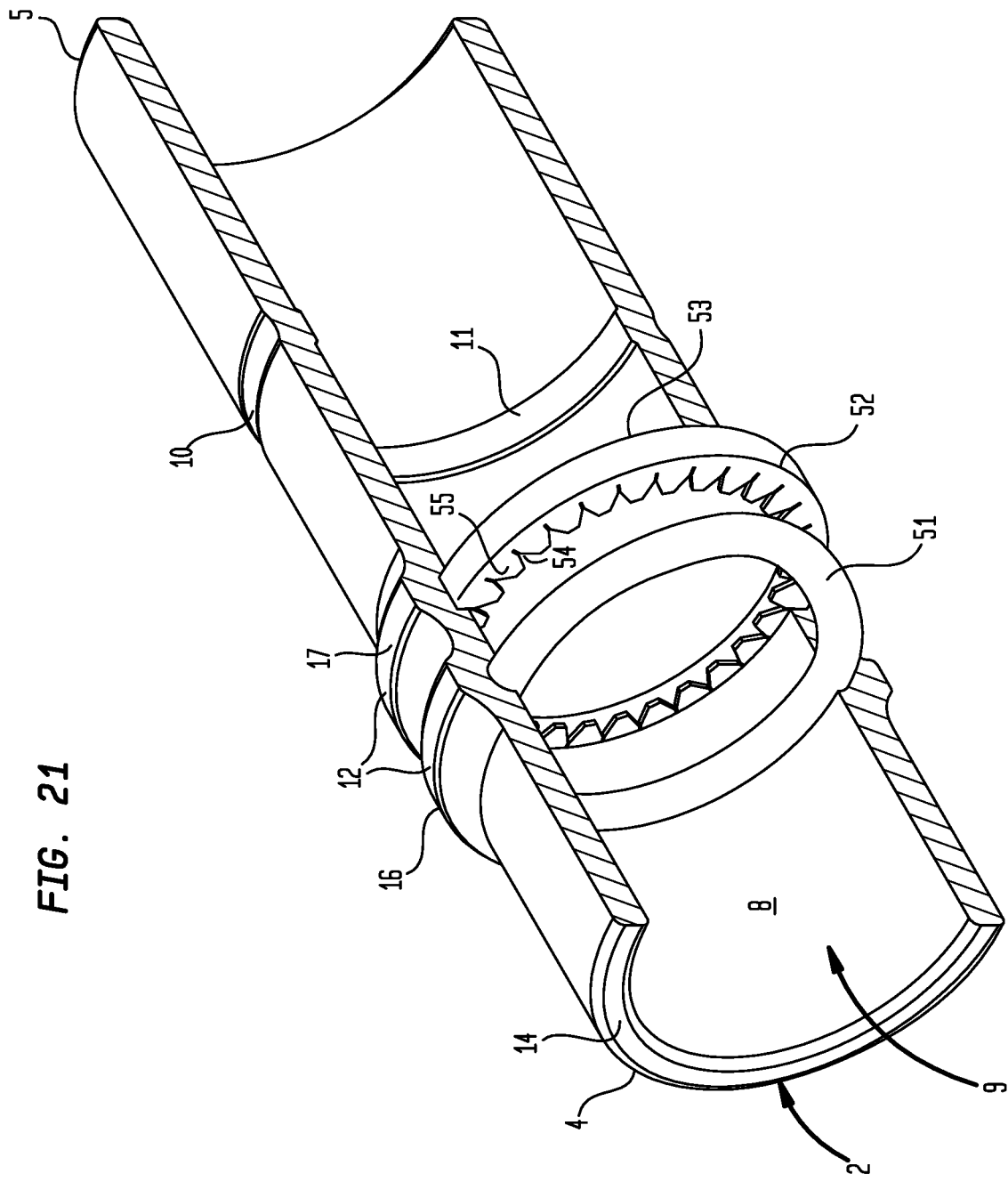
FIG. 21 is a perspective cross sectional view 21-21 of the particular embodiment of the coupler shown in FIG. 1 further including a seal element and an annular retaining member.
Figure 22:
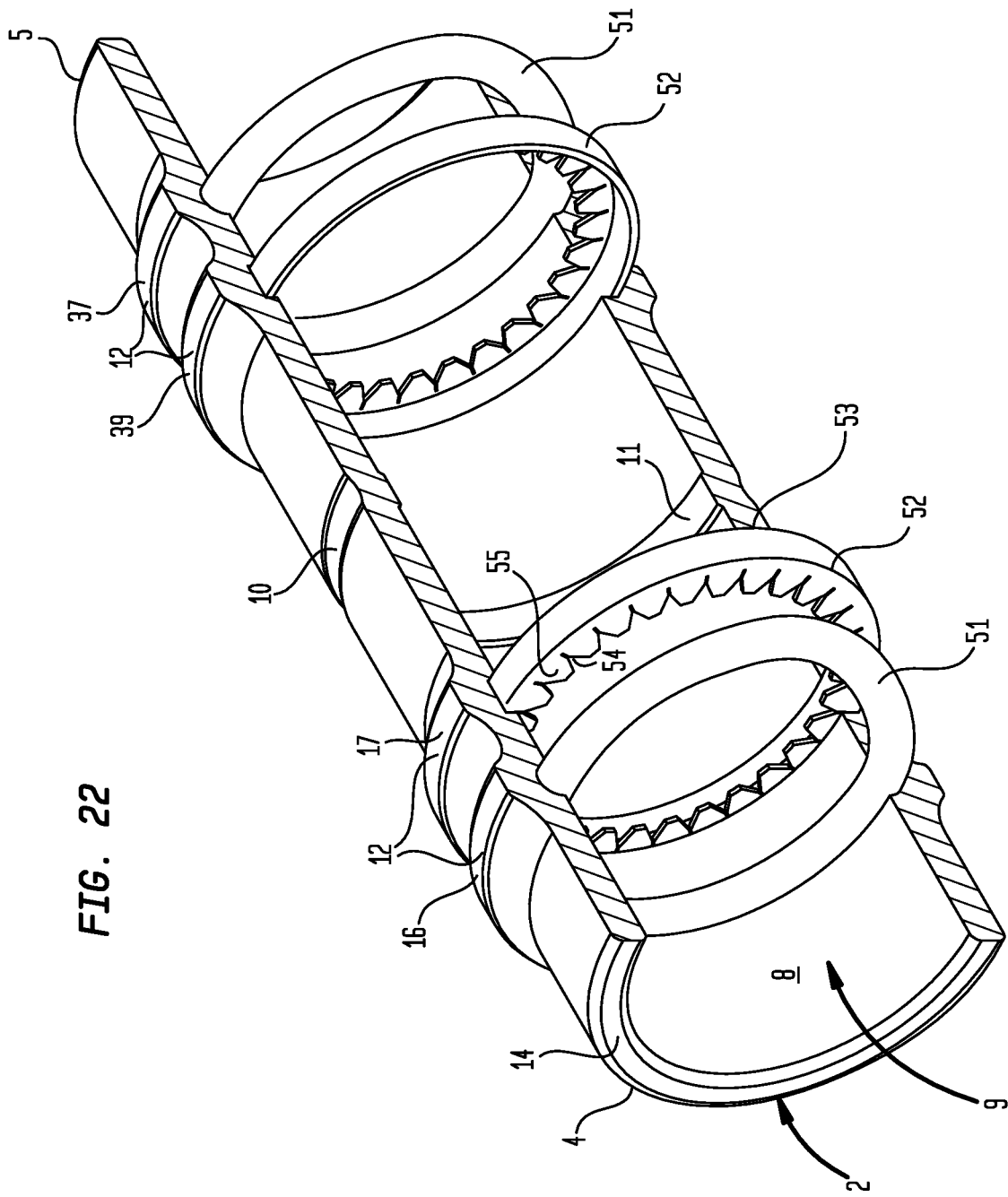
FIG. 22 is a perspective cross sectional view 22-22 of another particular embodiment of a coupler shown in FIG. 7 further including a seal element and an annular retaining member at each of the first end and the second end of the tubular conduit.

Now referring primarily to FIGS. 21 and 22, particular embodiments of the coupler (1) can include a seal element (51) disposed in the first internal annular groove (18)(also referred to as the "first internal annular seal groove"). The seal element (51) can be configured to have a portion of the seal element (51) extending outward of the internal surface (8) into the interior passage (9). While the seal element shown in FIGS. 21 and 22 have a circular cross-sectional width; this is not intended to preclude particular embodiments of the seal element having other configurations of the cross-sectional width such as square, rectangular, or oval cross-sectional widths. The seal element (51) can be produced from a material selected from the group including or consisting of: ethylene propylene diene monomer, silicone, fluorocarbon, fluorosilicone, polyurethane, tetrafluoroethylene/propylene, nitrile, and neoprene, or combinations thereof.

Again referring primarily to FIGS. 21 and 22, particular embodiments of the coupler (1) can further include an annular retaining member (52). The annular retaining member (52) can have an outer periphery (53) and an inner periphery (54). A plurality of slots can be disposed in circumferentially spaced apart relation about the inner periphery (54) and radially extend from the inner periphery (54) toward the outer periphery (53) to define a plurality of tabs (55). As to particular embodiments, the plurality of tabs (55) can be a plurality of resiliently flexible tabs. In particular embodiments, each of the plurality of tabs (55) can taper toward the inner periphery (as shown in the examples of FIGS. 21 and 22). The outer periphery (53) can be disposed in the second internal annular groove (19)(also referred to as a "first internal annular retainer groove"). The annular retaining member (52) can be produced from a material selected from the group including or consisting of rust-resistant metal, coated metal, metal, rigid plastics, coated rigid plastics, or combinations thereof.

Now referring primarily to FIGS. 11 through 20, particular embodiments of a coupler (1) can include one or more tubular guides (56). A first tubular guide (57) can be coupled to the conduit first end (4). The first tubular guide (57) can widen between the conduit first end (4) and a first tubular guide terminal end (58). Now referring primarily to FIG. 13A, the first tubular guide (57) can have a first tubular guide length (59) disposed between the tubular conduit first end (4) and the first tubular guide terminal end (58) of between about 0.5 inches (12.7 mm) to about 1 inch (25.4 mm). However, this illustrative range is not intended to preclude embodiments having a greater or lesser length.

Now referring primarily to FIG. 13A, the first tubular guide (57) can further include a first tubular guide first region (60) and a first tubular guide second region (61). The first tubular guide first region (60) can be disposed proximate the conduit first end (4). The first tubular guide first region (60) can further have a first radius of curvature (62) along the longitudinal axis (63) of the first tubular guide (57). The first tubular guide second region (61) can be disposed adjacent the first tubular guide first region (60) and extend toward the first tubular guide terminal end (58). The first tubular guide second region (61) can have a second radius of curvature (64) along the longitudinal axis (63) of the first tubular guide (57). In particular embodiments, the second radius of curvature (64) can be less than the first radius of curvature (62).

Again referring primarily to FIG. 13A, in particular embodiments, the first tubular guide first region (60) can have a first radius of curvature (62) of about 0.450 inches (11.4 millimeters) to about 0.700 inches (17.8 millimeters). In further embodiments, the first radius of curvature (62) can be selected from the group consisting of: about 0.460 inches (11.7 mm) to about 0.500 inches (12.7 mm), about 0.475 inches (12.1 mm) to about 0.525 inches (13.3 mm), about 0.500 inches (12.7 mm) to about 0.550 inches (14.0 mm), about 0.525 inches (13.3 mm) to about 0.575 inches (14.6 mm), about 0.550 inches (14.0 mm) to about 0.600 inches (15.2 mm), about 0.575 inches (14.6 mm) to about 0.625 inches (15.9 mm), about 0.600 inches (15.2 mm) to about 0.650 inches (16.5 mm), about 0.625 inches (15.9 mm) to about 0.675 inches (17.1 mm), about 0.650 inches (16.5 mm) to about 0.690 inches (17.5 mm), and combinations thereof. However, these examples of a first radius of curvature (62) are not intended to preclude embodiments having a greater or lesser first radius of curvature (62).

Again referring primarily to FIG. 13A, in particular embodiments, the first tubular guide second region (61) can have a second radius of curvature (64) of about 0.150 inches (3.8 millimeters) to about 0.450 inches (11.4 millimeters). In further embodiments, the second radius of curvature (64) can be selected from the group consisting of: about 0.160 inches (4.1 mm) to about 0.200 inches (5.1 mm), about 0.175 inches (4.4 mm) to about 0.225 inches (5.7 mm), about 0.200 inches (5.1 mm) to about 0.250 inches (6.4 mm), about 0.225 inches (5.7 mm) to about 0.275 inches (7.0 mm), about 0.250 inches (6.4 mm) to about 0.300 inches (7.6 mm), about 0.275 inches (7.0 mm) to about 0.325 inches (8.3 mm), about 0.300 inches (7.6 mm) to about 0.350 inches (8.9 mm), about 0.325 inches (8.3 mm) to about 0.375 inches (9.5 mm), about 0.350 inches (8.9 mm) to about 0.400 inches (10.2 mm), about 0.375 inches (9.5 mm) to about 0.425 inches (10.8 mm), about 0.400 inches (10.2 mm) to about 0.440 inches (11.2 mm), and combinations thereof. However, these examples of a second radius of curvature (64) are not intended to preclude embodiments having a greater or lesser second radius of curvature (64).

Figure 23:
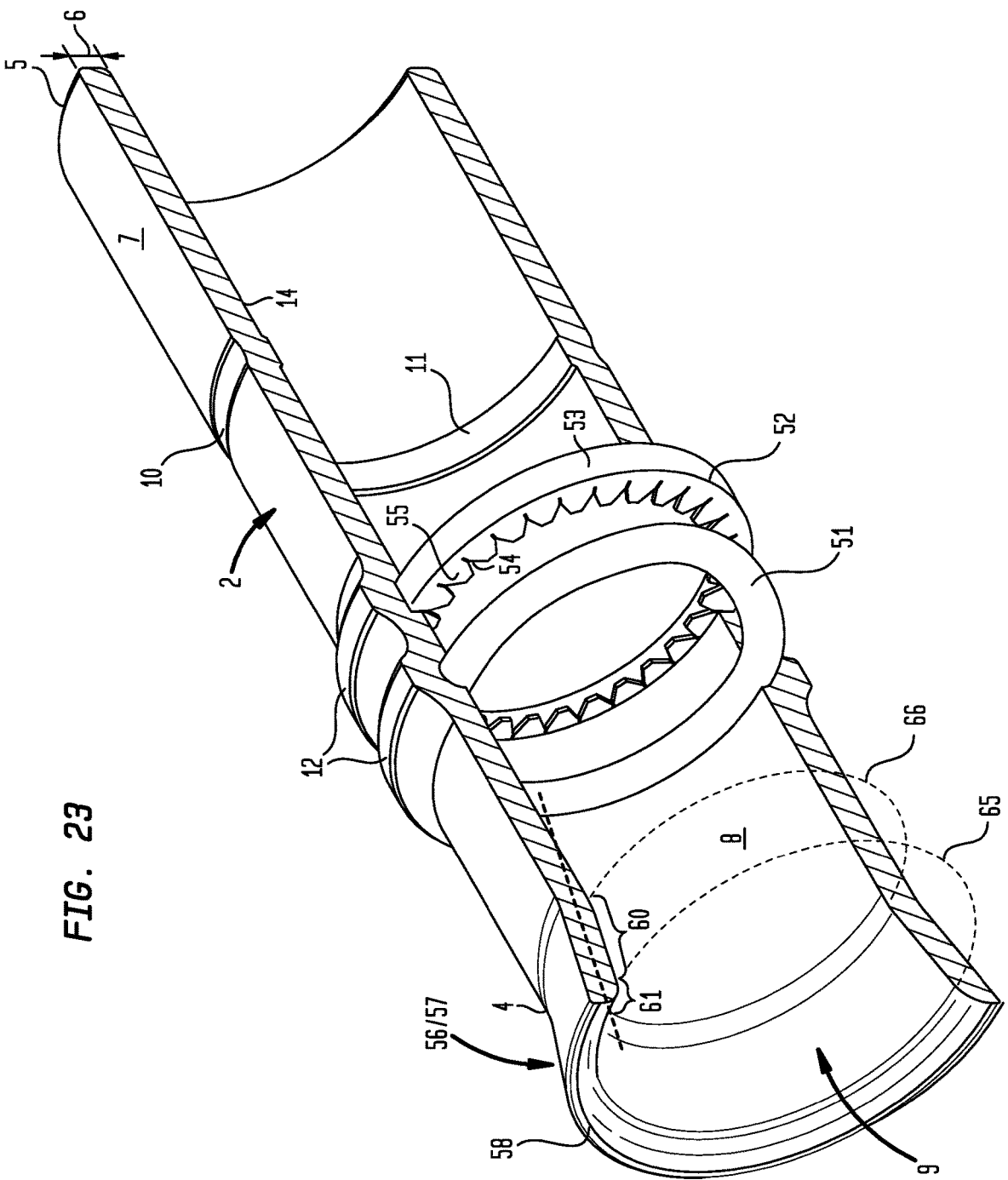
FIG. 23 is a perspective cross sectional view 23-23 of the particular embodiment of the coupler shown in FIG. 11 further including a seal element and an annular retaining member.

Now referring primarily to FIG. 23, in particular embodiments, the ratio of the cross-section area (65) of the first tubular guide (57) at the first tubular guide terminal end (58) orthogonal to the longitudinal axis of the tubular conduit (2) to the cross-section area (66) of the first tubular guide (57) at the conduit first end (4) orthogonal to the longitudinal axis of the tubular conduit (2) can have a first ratio of about 1:0.75 to about 1:0.95. In further embodiments, the first ratio can be selected from the group consisting of: about 1:0.76 to about 1:0.77, about 1:0.765 to about 1:0.775, about 1:0.77 to about 1:0.78, about 1:0.775 to about 1:0.785, about 1:0.78 to about 1:0.79, about 1:0.785 to about 1:0.795, about 1:0.79 to about 1:0.80, about 1:0.795 to about 1:0.805, about 1:0.80 to about 1:0.81, about 1:0.805 to about 1:0.815, about 1:0.81 to about 1:0.82, about 1:0.815 to about 1:0.825, about 1:0.82 to about 1:0.83, about 1:0.825 to about 1:0.835, about 1:0.83 to about 1:0.84, about 1:0.835 to about 1:0.845, about 1:0.84 to about 1:0.85, about 1:0.845 to about 1:0.855, about 1:0.85 to about 1:0.86, about 1:0.855 to about 1:0.865, about 1:0.86 to about 1:0.87, about 1:0.865 to about 1:0.875, about 1:0.87 to about 1:0.88, about 1:0.875 to about 1:0.885, about 1:0.88 to about 1:0.89, about 1:0.885 to about 1:0.895, about 1:0.89 to about 1:0.90, about 1:0.895 to about 1:0.905, about 1:0.90 to about 1:0.91, about 1:0.905 to about 1:0.915, about 1:0.91 to about 1:0.92, about 1:0.915 to about 1:0.925, about 1:0.92 to about 1:0.93, about 1:0.925 to about 1:0.935, about 1:0.93 to about 1:0.94, and combinations thereof. However, these examples of a first ratio are not intended to preclude embodiments having a greater or lesser first ratio.

Now referring primarily to FIGS. 16 through 20, particular embodiments of a coupler (1) can further include a second tubular guide (67) coupled to the conduit second end (5). The second tubular guide (67) can widen between the conduit second end (5) and a second tubular guide terminal end (68). The second tubular guide (67) can include a second tubular guide first region (69) proximate the conduit second end (5). The second tubular guide first region (69) can have a third radius of curvature (70) along the longitudinal axis (71) of the second tubular guide (67). The second tubular guide (67) can further have a second tubular guide second region (72) disposed adjacent to the second tubular guide first region (69) and extending toward the second tubular guide terminal end (68). The second tubular guide second region (72) can have a fourth radius of curvature (73) along the longitudinal axis (71) of the second tubular guide (67). In particular embodiments, the fourth radius of curvature (73) of the second tubular guide second region (72) can be less than the third radius of curvature (70) of the second tubular guide first region (69).

Now referring primarily to FIG. 18A, in particular embodiments, the second tubular guide first region (69) can have a third radius of curvature (70) of about 0.450 inches (11.4 millimeters) to about 0.700 inches (17.8 millimeters). In further embodiments, the third radius of curvature (70) of the second tubular guide first region (69) can be selected from the group consisting of: about 0.460 inches (11.7 mm) to about 0.500 inches (12.7 mm), about 0.475 inches (12.1 mm) to about 0.525 inches (13.3 mm), about 0.500 inches (12.7 mm) to about 0.550 inches (14.0 mm), about 0.525 inches (13.3 mm) to about 0.575 inches (14.6 mm), about 0.550 inches (14.0 mm) to about 0.600 inches (15.2 mm), about 0.575 inches (14.6 mm) to about 0.625 inches (15.9 mm), about 0.600 inches (15.2 mm) to about 0.650 inches (16.5 mm), about 0.625 inches (15.9 mm) to about 0.675 inches (17.1 mm), about 0.650 inches (16.5 mm) to about 0.690 inches (17.5 mm), and combinations thereof.

Again, referring primarily to FIG. 18A, in particular embodiments, the second tubular guide second region (72) can have a fourth radius of curvature (73) of about 0.150 inches (3.8 millimeters) to about 0.450 inches (11.4 millimeters). In further embodiments, the fourth radius of curvature (73) can be selected from the group consisting of: about 0.160 inches (4.1 mm) to about 0.200 inches (5.1 mm), about 0.175 inches (4.4 mm) to about 0.225 inches (5.7 mm), about 0.200 inches (5.1 mm) to about 0.250 inches (6.4 mm), about 0.225 inches (5.7 mm) to about 0.275 inches (7.0 mm), about 0.250 inches (6.4 mm) to about 0.300 inches (7.6 mm), about 0.275 inches (7.0 mm) to about 0.325 inches (8.3 mm), about 0.300 inches (7.6 mm) to about 0.350 inches (8.9 mm), about 0.325 inches (8.3 mm) to about 0.375 inches (9.5 mm), about 0.350 inches (8.9 mm) to about 0.400 inches (10.2 mm), about 0.375 inches (9.5 mm) to about 0.425 inches (11.0 mm), about 0.400 inches (10.2 mm) to about 0.440 inches (11.2 mm), and combinations thereof.

Figure 24:
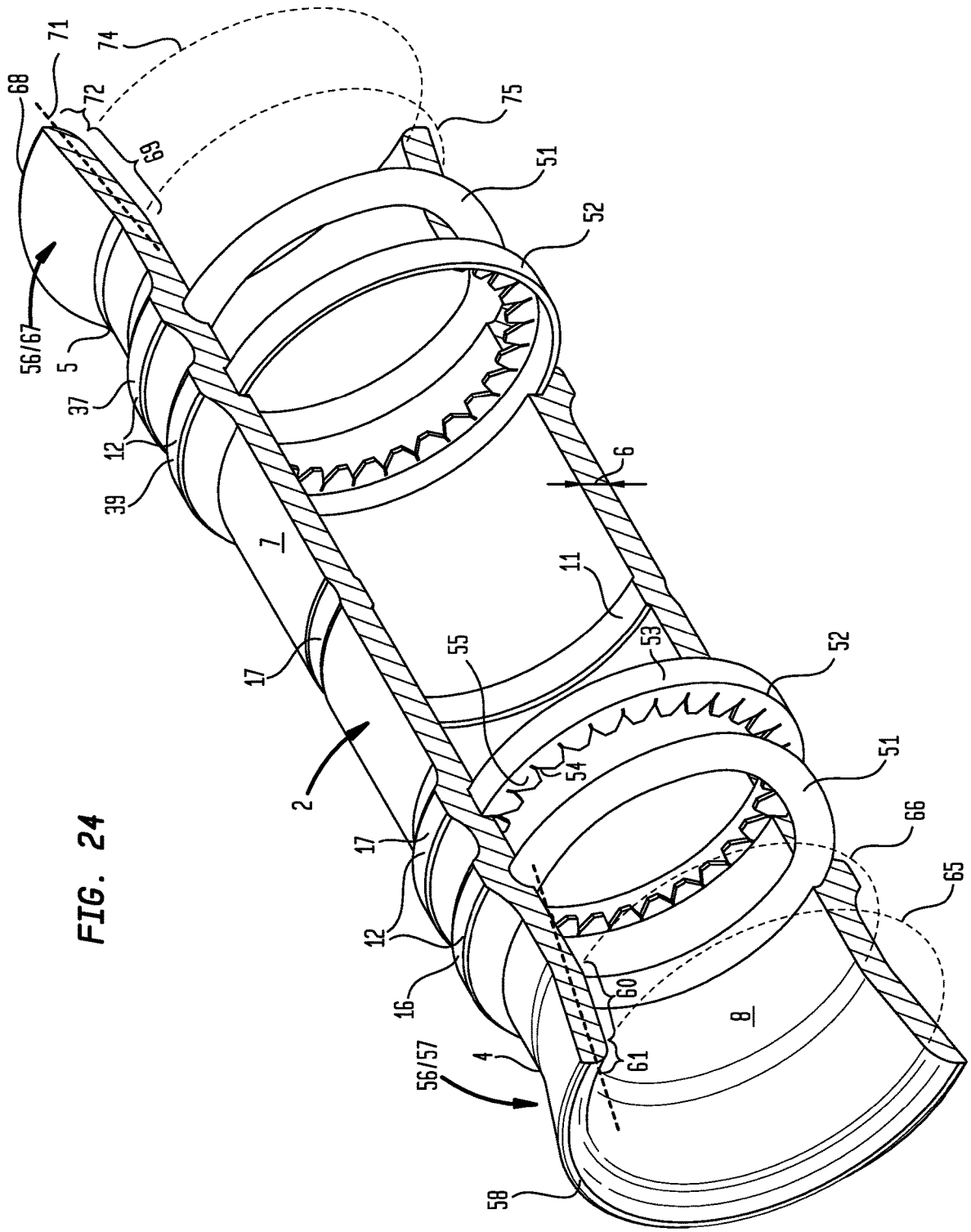
FIG. 24 is a perspective cross sectional view 24-24 of the particular embodiment of a coupler shown in FIG. 17 further including a seal element and an annular retaining member at each of the first end and the second end of the tubular conduit.

Now referring primarily to FIG. 24, in particular embodiments, the ratio of a cross-section area (74) of the second tubular guide (67) at the second tubular guide terminal end (68) orthogonal to the longitudinal axis of the tubular conduit (2) to a cross-section area (75) of said second tubular guide (67) at the conduit second end (5) orthogonal to the longitudinal axis (71) of the tubular conduit (2) can have a second ratio of about 1:0.75 to about 1:0.95. In further embodiments, the second ratio can be selected from the group consisting of: about 1:0.76 to about 1:0.77, about 1:0.765 to about 1:0.775, about 1:0.77 to about 1:0.78, about 1:0.775 to about 1:0.785, about 1:0.78 to about 1:0.79, about 1:0.785 to about 1:0.795, about 1:0.79 to about 1:0.80, about 1:0.795 to about 1:0.805, about 1:0.80 to about 1:0.81, about 1:0.805 to about 1:0.815, about 1:0.81 to about 1:0.82, about 1:0.815 to about 1:0.825, about 1:0.82 to about 1:0.83, about 1:0.825 to about 1:0.835, about 1:0.83 to about 1:0.84, about 1:0.835 to about 1:0.845, about 1:0.84 to about 1:0.85, about 1:0.845 to about 1:0.855, about 1:0.85 to about 1:0.86, about 1:0.855 to about 1:0.865, about 1:0.86 to about 1:0.87, about 1:0.865 to about 1:0.875, about 1:0.87 to about 1:0.88, about 1:0.875 to about 1:0.885, about 1:0.88 to about 1:0.89, about 1:0.885 to about 1:0.895, about 1:0.89 to about 1:0.90, about 1:0.895 to about 1:0.905, about 1:0.90 to about 1:0.91, about 1:0.905 to about 1:0.915, about 1:0.91 to about 1:0.92, about 1:0.915 to about 1:0.925, about 1:0.92 to about 1:0.93, about 1:0.925 to about 1:0.935, about 1:0.93 to about 1:0.94, and combinations thereof. However, these examples of a second ratio are not intended to preclude embodiments having a greater or lesser second ratio.

Now referring primarily to FIG. 18A the second tubular guide (67) can have a second tubular guide length (76) disposed between the tubular conduit second end (5) and the second tubular guide terminal end (68) of between about 0.5 inches (12.7 mm) to about 1 inch (25.4 mm). However, this illustrative range is not intended to preclude embodiments have a greater or lesser length.

Now referring to FIGS. 25 and 26, a method of using the coupler (1) in a pipeline system (82) includes by insertingly engaging a first pipe first end (77) of a first pipe (78) into the first end (4) of the tubular conduit (2), and insertingly engaging a second pipe first end (79) of a second pipe (80) to the second end (5) of the tubular conduit (2). As to particular embodiments, the first pipe first end (77) of a first pipe (78) may be coupled in fixed engagement with the first end (4) of the tubular conduit (2) by interference fit or through the use of an amount of adhesive. However, as to particular embodiments, the first pipe first end (77) may not be coupled in fixed engagement to the coupler (1) by interference fit or the use of adhesives, whether due to the differences in the materials of the first pipe end (7) and the first end (4) of the tubular conduit (2), or otherwise. Accordingly, the first pipe first end (77) can be slidingly inserted into the first end (4) of the tubular conduit (2) to sealably engage the seal element (51) and sufficiently flex the resiliently flexible tabs (55) of the annular retaining member (52) to allow passage through the annular retaining member (52) toward the internal annular member (11). The resiliently flexible tabs (55) forcibly engage the first pipe first end (77) to prevent egress from the annular retaining member (52). The second pipe first end (79) may be compatible with interference fit or the use of adhesive to couple the second pipe (80) in fixed engagement to the second end (5) of the tubular conduit (2). Accordingly, an amount of adhesive can be disposed on the internal surface (8) of the tubular conduit (2) adjacent the second end (5). Adhesive can also be disposed on the second pipe (80) adjacent the second pipe first end (79) and the second pipe first end (79) can be slidingly inserted in the coupler second end (5) toward the internal annular member (11). As one illustrative example, the adhesive can, but need not necessarily, be an adhesive for adhering surfaces of polyvinyl chloride material.

Figure 27:
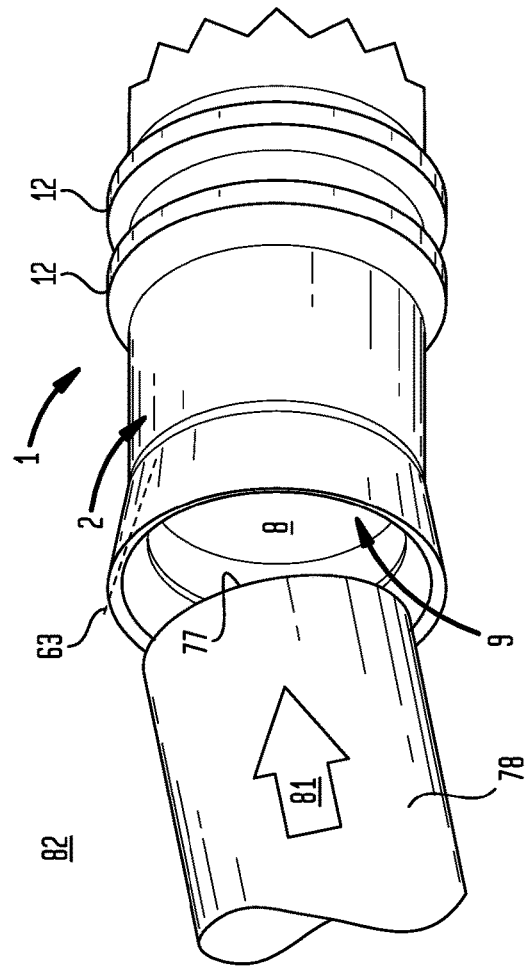
FIG. 27 illustrates a method of using a particular embodiment of a coupler in which a pipe first end engages a tubular guide of the couple to guide the pipe into the interior passage of the coupler.
Figure 28:
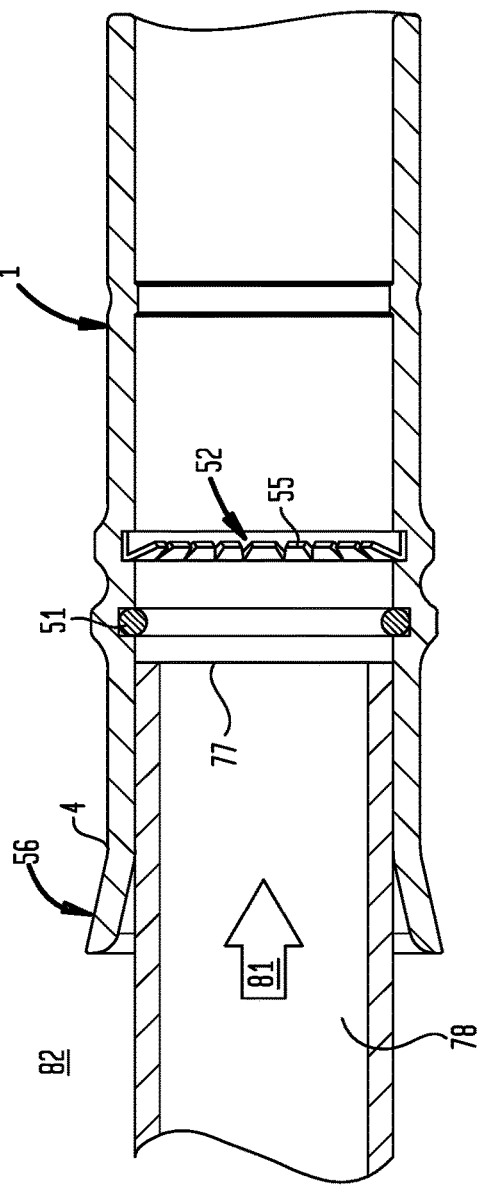
FIG. 28 is a cross section of a particular embodiment of a coupler having a pipe inserted into the interior passage of the coupler.

Generally referring to FIGS. 27 and 28, in particular embodiments, a method of using a coupler (1) including a tubular guide (56) can include positioning a coupler (1) in spatial relation to a first pipe first end (77). The first pipe first end (77) may be disposed in an angled relation to a longitudinal axis (63) of a tubular guide (56) coupled to a tubular conduit (2) of a coupler (1). The method can further include forcibly urging (81) the first pipe first end (77) along the tubular guide (56), and guiding the first pipe first end (77) into the interior passage (9) of the tubular conduit (2). In particular embodiments, the coupler (1) can, but need not necessarily include a seal element (51), and the first pipe first end (77) can be slidingly inserted into the conduit first end (4) to sealably engage the seal element (51). In further particular embodiments, the coupler (1) can include an annular retaining member (52) having resiliently flexible tabs (55), whereupon the first pipe first end (77) can be slidingly inserted into the conduit first end (4), sufficiently flexing the resiliently flexible tabs (55) of the annular retaining member (52) to allow passage through the annular retaining member (52). The resiliently flexible tabs (55) can forcibly engage the first pipe first end (77) to prevent egress from the annular retaining member (52).

As can be easily understood from the foregoing, the basic concepts of the present invention may be embodied in a variety of ways. The invention involves numerous and varied embodiments of a coupler and methods for making and using such couplers including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the couplers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of connecting oil or gas pipes, comprising:
    positioning a pair of pipe ends of oil or gas pipes proximate corresponding one of a pipe connector first end and a pipe connector second end, wherein said first of said pair of pipe ends comprises a first material and said second of said pair of pipe ends comprises a second material, said first material different material than said second material, said pipe connector including:
        a tubular conduit formed of one plastic material having a length disposed between said pipe connector first end and a pipe connector second end, said pipe connector having a pipe connector wall disposed between a pipe connector external surface and a pipe connector internal surface, said pipe connector internal surface defining an interior passage open at said pipe connector first end and said pipe connector second end to correspondingly receive said pair of pipe ends, wherein said pipe connector first end including:
        a first internal annular seal groove circumferentially disposed in said pipe connector internal surface of said tubular conduit proximate said pipe connector first end;
        a first seal element disposed in said first internal annular seal groove, wherein a portion of said first seal element extends outward of said pipe connector internal surface into said interior passage;
    inserting said first of said pair of pipe ends of said first material into said pipe connector first end;
    sealably engaging said first of said pair of pipe ends with said first seal element;
    inserting said second of said pair of pipe ends of said second material into said pipe connector second end; and
    sealably engaging said second of said pair of pipe ends with said pipe connector internal surface of said pipe connector second end, said internal surface of said pipe connector second end having a constant cross-section diameter in axial direction between said pipe connector second end and an internal annular member circumferentially medially disposed on said pipe connector internal surface of said tubular conduit.

2. The method of claim 1, further comprising,
    inserting said first of said pair of pipe ends through an annular retaining member disposed in a first internal annular retainer groove circumferentially disposed in said internal surface of said tubular conduit adjacent said a first internal annular seal groove proximate said pipe connector first end; and
    flexing said plurality of resiliently flexible tabs which retain said first of said pair of pipe ends within said annular retaining member.

3. The method of claim 2, further comprising disposing said first of said pair of pipe ends adjacent said internal annular member circumferentially medially disposed on said pipe connector internal surface.

4. The method of claim 3,
further comprising, determining based upon a location of an external annular groove on said pipe connector external surface a corresponding length of said oil or gas pipe to insert into said pipe connector first end.

5. The method of claim 4,
further comprising slidably engaging said first of said pair of pipe ends along a taper of said pipe connector internal surface approaching said first internal annular seal groove.

6. The method of claim 5, further comprising opposing forces of sealably engaging said first of said pair pipe ends with said seal element with a first external annular member overlaying said first internal annular seal groove circumferentially disposed on said pipe connector internal surface.

7. The method of claim 6, further comprising opposing forces of inserting said first of said pair of pipe ends through said annular retaining member flexing said plurality of resiliently flexible tabs which retain said first of said pair of pipe ends within said annular retaining member with a second external annular member circumferentially disposed on said pipe connector external surface, said second external annular member overlaying said second internal annular retainer groove circumferentially disposed on said pipe connector internal surface.

8. The method of claim 7, further comprising, passing said first of said pair of pipe ends through a first tubular pipe guide coupled to said pipe connector first end, said tubular pipe guide widening approaching a first pipe guide terminal end,
said first tubular pipe guide including:
a first region proximate said pipe connector first end;
a second region adjacent said first region and extending toward said tubular pipe guide terminal end;
said first region having a first radius of curvature along a longitudinal axis of said tubular guide;
said second region having a second radius of curvature along a longitudinal axis of said tubular guide,
said second radius of curvature less than said first radius of curvature.

9. The method of claim 8, further comprising engaging said first of said pair of pipe ends with said first tubular pipe guide.

10. The method of claim 9, further comprising slidably guiding said first of said pair of pipe ends along said first tubular pipe guide.

11. The method of claim 1, further comprising:
inserting a second of said pair of pipe ends into said pipe connector second end including a taper in said pipe connector internal surface from said pipe connector second end approaching said internal annular member circumferentially medially disposed on said pipe connector internal surface; and
disposing said second of said pair of pipe ends adjacent said internal annular member.

12. The method of claim 11, further comprising interference fitting said second of said pair of pipe ends to said pipe connector internal surface of said pipe connector second end.

13. The method of claim 11, further comprising adhering said second of said pair of pipe ends to said pipe connector internal surface of said pipe connector second end.

14. A method of connecting oil and gas pipes, comprising:
positioning a first of a pair of pipe ends of oil or gas pipes proximate a pipe connector first end, said pipe connector including:
a tubular conduit having a length disposed between said pipe connector first and second ends, said pipe connector having a pipe connector wall disposed between a pipe connector external surface and a pipe connector internal surface, said pipe connector internal surface defining an interior passage open at said pipe connector first end and said pipe connector second end to correspondingly receive said pair of pipe ends, wherein said pipe connector first end including:
a first internal annular retainer groove circumferentially disposed in said internal surface of said tubular conduit;
a first annular retaining member having an outer periphery and an inner periphery, said outer periphery disposed in said first internal annular retainer groove, said inner periphery having a plurality of radially extending slots in circumferentially spaced apart relation about said inner periphery defining a plurality of resiliently flexible tabs,
a first external annular member circumferentially disposed on said pipe connector external surface, said first external annular member overlaying said first internal annular retaining member groove circumferentially disposed on said pipe connector internal surface, said first external annular member opposing forces of engaging said first of said pair pipe ends with said first internal annular retaining member;
inserting said first of said pair of pipe ends into said pipe connector first end; and
engaging said first of said pair of pipe ends with said first internal annular retaining member disposed in said first internal annular retaining member.

15. The method of claim 14, further comprising:
positioning a second of said pair of pipe ends of oil or gas pipes proximate said pipe connector second end, wherein said pipe connector second end including:
a second annular retaining member having an outer periphery and an inner periphery, said outer periphery disposed in said first internal annular retainer groove, said inner periphery having a plurality of radially extending slots in circumferentially spaced apart relation about said inner periphery defining a plurality of resiliently flexible tabs,
a second external annular member circumferentially disposed on said pipe connector external surface, said second external annular member overlaying said second internal annular retaining member groove circumferentially disposed on said pipe connector internal surface, said second external annular member opposing forces of sealably engaging said second of said pair pipe ends with said second internal annular retaining member
inserting said second of said pair of pipe ends through said second annular retaining member disposed in said second internal annular retainer groove circumferentially disposed in said pipe connector internal surface of said tubular conduit; and
flexing said plurality of resiliently flexible tabs which retain said second of said pair of pipe ends within said second annular retaining member.

16. The method of claim 15, wherein said pipe connector first end further including:
a first internal annular seal groove circumferentially disposed in said internal surface of said tubular conduit proximate said pipe connector first end;

a first seal element disposed in said first internal annular seal groove, wherein a portion of said first seal element extends outward of said pipe connector internal surface into said interior passage;

a third external annular member circumferentially disposed on said pipe connector external surface, said third external annular member overlaying said first internal annular seal groove circumferentially disposed on said pipe connector internal surface, said third external annular member opposing forces of sealably engaging said first of said pair pipe ends with said first internal annular seal;

inserting said first of said pair of pipe ends into said pipe connector first end; and sealably engaging said first of said pair of pipe ends with said first seal element disposed in said first second internal annular seal groove.

17. The method of claim 16, wherein said pipe connector second end further including:

a second internal annular seal groove circumferentially disposed in said internal surface of said tubular conduit proximate said pipe connector second end;

a second seal element disposed in said second internal annular seal groove, wherein a portion of said second seal element extends outward of said pipe connector internal surface into said interior passage;

a fourth external annular member circumferentially disposed on said pipe connector external surface, said fourth external annular member overlaying said second internal annular seal groove circumferentially disposed on said pipe connector internal surface, said fourth external annular member opposing forces of sealably engaging said second of said pair pipe ends with said second internal annular seal;

inserting said second of said pair of pipe ends into said pipe connector first end; and sealably engaging said second of said pair of pipe ends with said second seal element disposed in said second second internal annular seal groove.

18. The method of claim 14, wherein said first of said pair of pipe ends comprises a plastic pipe end and wherein said second of said pair of pipe ends comprises a metal pipe end.

19. A method of connecting oil or gas pipes, comprising:

positioning a pair of pipe ends of oil or gas pipes proximate corresponding pipe connector first and second ends, said pipe connector including:

a tubular conduit having a length disposed between said pipe connector first and second ends, said pipe connector having a pipe connector wall disposed between a pipe connector external surface and a pipe connector internal surface, said pipe connector internal surface defining an interior passage open at said pipe connector first end and said pipe connector second end to correspondingly receive said pair of pipe ends, wherein said pipe connector first end including:

a first internal annular seal groove circumferentially disposed in said internal surface of said tubular conduit proximate said pipe connector first end;

a first seal element disposed in said first internal annular seal groove, wherein a portion of said first seal element extends outward of said pipe connector internal surface into said interior passage;

a first internal annular retainer groove circumferentially disposed in said internal surface of said tubular conduit;

a first annular retaining member having an outer periphery and an inner periphery, said outer periphery disposed in said first internal annular retainer groove, said inner periphery having a plurality of radially extending slots in circumferentially spaced apart relation about said inner periphery defining a plurality of resiliently flexible tabs, a first external annular member circumferentially disposed on said pipe connector external surface, said first external annular member overlaying said first internal annular seal groove circumferentially disposed on said pipe connector internal surface, said first external annular member opposing forces of sealably engaging said first of said pair pipe ends with said seal element, a second external annular member circumferentially disposed on said pipe connector external surface, said second external annular member overlaying said a first internal annular retainer groove circumferentially disposed on said pipe connector internal surface, said second external annular member opposing forces of inserting said first of said pair of pipe ends through said annular retaining member flexing said plurality of resiliently flexible tabs which retain said first of said pair of pipe ends within said annular retaining member;

inserting said first of said pair of pipe ends into said pipe connector first end;

sealably engaging said first of said pair of pipe ends with said first seal element;

inserting said second of said pair of pipe ends into said pipe connector second end; and sealably engaging said second of said pair of pipe ends with a pipe connector second end internal surface.

20. The method of claim 19, wherein said pipe connector second end further including:

a second internal annular seal groove circumferentially disposed on said internal surface of said tubular conduit proximate said pipe connector second end;

a second seal element disposed in said second internal annular groove, wherein a portion of said second seal element extends outward of said internal surface into said interior passage;

inserting said second of said pair of pipe ends into said pipe connector second end; and sealably engaging said second of said pair of pipe ends of said oil or gas pipe with said second seal element.

21. The method of claim 20, wherein said pipe connector second end further including:

a second internal annular retainer groove circumferentially disposed in said internal surface of said tubular conduit;

a second annular retaining member having an outer periphery and an inner periphery, said outer periphery disposed in said second internal annular retainer groove, said inner periphery having a plurality of radially extending slots in circumferentially spaced apart relation about said inner periphery defining a plurality of resiliently flexible tabs; and further comprising:

inserting said second of said pair of pipe ends through said annular retaining member flexing said plurality of resiliently flexible tabs which retain said first of said pair of pipe ends within said annular retaining member.

22. The method of claim 21, further comprising disposing said second of said pair of pipe ends adjacent said internal annular member circumferentially medially disposed on said pipe connector internal surface.

23. The method of claim 22, determining based upon location of an external annular groove on said pipe connector external surface a corresponding length of said oil or gas pipe to insert into said pipe connector second end.

24. The method of claim 23, wherein said pipe connector second end further including a taper of said pipe connector internal surface approaching said second internal annular seal groove; and further comprising slidably engaging said second of said pair of pipe ends along said taper.

25. The method of claim 24, wherein said pipe connector second end further including a third external annular member circumferentially disposed on said pipe connector external surface, said third external annular member overlaying said second internal annular seal groove circumferentially disposed on said pipe connector internal surface, said first external annular member opposing forces of sealably engaging said second of said pair pipe ends with said seal element.

26. The method of claim 25, wherein said pipe connector second end further including a fourth external annular member circumferentially disposed on said pipe connector external surface, said first external annular member overlaying said first internal annular groove circumferentially disposed on said pipe connector internal surface, said fourth external annular member opposing forces of inserting said second of said pair of pipe ends through said second annular retaining member flexing said plurality of resiliently flexible tabs which retain said second of said pair of pipe ends within said second annular retaining member.

27. A method of connecting oil or gas pipes, comprising:
positioning a pair of pipe ends of oil or gas pipes proximate corresponding pipe connector first and second ends, said pipe connector including:
a tubular conduit having a length disposed between said pipe connector first and second ends, said pipe connector having a pipe connector wall disposed between a pipe connector external surface and a pipe connector internal surface, said pipe connector internal surface defining an interior passage open at said pipe connector first end and said pipe connector second end to correspondingly receive said pair of pipe ends, wherein said pipe connector first end including:
a first tubular pipe guide coupled to said pipe connector first end, said pipe connector first end widening approaching a first pipe guide terminal end, said first tubular pipe guide including:
a first region proximate said pipe connector first end;
a second region adjacent said first region and extending toward said tubular pipe guide terminal end;
said first region having a first radius of curvature along a longitudinal axis of said tubular guide;
said second region having a second radius of curvature along said longitudinal axis of said tubular guide, said second radius of curvature less than said first radius of curvature; and
passing said first of said pair of pipe ends through said first tubular pipe guide.

\* \* \* \* \*